United States Patent
Yoneda

(10) Patent No.: US 10,269,523 B2
(45) Date of Patent: *Apr. 23, 2019

(54) PROTECTION ELEMENT

(71) Applicant: DEXERIALS CORPORATION, Tokyo (JP)

(72) Inventor: Yoshihiro Yoneda, Tochigi (JP)

(73) Assignee: DEXERIALS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/989,571

(22) Filed: May 25, 2018

(65) Prior Publication Data

US 2018/0277327 A1  Sep. 27, 2018

Related U.S. Application Data

(63) Continuation of application No. 14/387,797, filed as application No. PCT/JP2013/059013 on Mar. 27, 2013, now Pat. No. 10,008,356.

(30) Foreign Application Priority Data

| Mar. 29, 2012 | (JP) | 2012-076928 |
| Dec. 25, 2012 | (JP) | 2012-281452 |
| Jan. 21, 2013 | (JP) | 2013-008302 |

(51) Int. Cl.
*H01H 85/06* (2006.01)
*H01H 85/046* (2006.01)
(Continued)

(52) U.S. Cl.
CPC .......... *H01H 85/06* (2013.01); *H01H 37/761* (2013.01); *H01H 2037/046* (2013.01)

(58) Field of Classification Search
CPC . H01H 37/761; H01H 85/06; H01H 2037/046
(Continued)

(56) References Cited

U.S. PATENT DOCUMENTS 2,809,257 A * 10/1957 Swain .................... H01H 85/06
337/159
2,911,504 A * 11/1959 Cohn .................. H01G 9/0003
337/159
(Continued)

FOREIGN PATENT DOCUMENTS

JP   S58-122350 U   8/1983
JP   S62-107341 U   7/1987
(Continued)

OTHER PUBLICATIONS

May 12, 2016 Office Action issued in U.S. Appl. No. 14/387,797.
(Continued)

*Primary Examiner* — Anatoly Vortman
(74) *Attorney, Agent, or Firm* — Oliff PLC

(57) ABSTRACT

The present invention aims to achieve a Pb-free protection element by using a layered body including a high melting point metal layer and a low melting point metal layer. A protection element includes an insulating substrate, a heating body, an insulating member, two electrodes, a heating body extraction electrode, and a fusible conductor. Furthermore, the fusible conductor includes a layered body including at least a high melting point metal layer and a low melting point metal layer, and the low melting point metal layer is melted by a heat generated by the heating body, whereby, while eroding the high melting point metal layer, the low melting point metal layer is drawn close to the side of the two electrodes and the heating body extraction
(Continued)

electrode, and fused, the two electrodes and the heating body extraction electrode each having high wettability for the low melting point metal layer.

7 Claims, 24 Drawing Sheets

(51) Int. Cl.
*H01H 37/76* (2006.01)
*H01H 37/04* (2006.01)

(58) Field of Classification Search
USPC .......................................................... 337/183
See application file for complete search history.

(56) References Cited

U.S. PATENT DOCUMENTS

| | | | | |
|---|---|---|---|---|
| 3,543,209 | A * | 11/1970 | Kozacka | H01H 85/10 337/159 |
| 3,763,454 | A * | 10/1973 | Zandonatti | H01H 37/761 337/404 |
| 4,315,235 | A | 2/1982 | Jacobs, Jr. | |
| 4,320,374 | A | 3/1982 | Narancic et al. | |
| 5,097,247 | A | 3/1992 | Doerrwaechter | |
| 5,153,805 | A | 10/1992 | Tennant et al. | |
| 5,712,610 | A * | 1/1998 | Takeichi | H01H 85/046 29/623 |
| 6,172,482 | B1 * | 1/2001 | Eguchi | H02H 7/18 320/134 |
| 6,300,859 | B1 | 10/2001 | Myong et al. | |
| 6,373,371 | B1 | 4/2002 | Doerrwaechter et al. | |
| 6,452,475 | B1 | 9/2002 | Kawazu et al. | |
| 6,462,318 | B2 | 10/2002 | Furuuchi et al. | |
| 6,566,995 | B2 | 5/2003 | Furuuchi et al. | |
| 6,917,505 | B2 * | 7/2005 | Iwasaki | H01M 2/34 361/104 |
| 7,088,216 | B2 | 8/2006 | Furuuchi | |
| 7,286,037 | B2 | 10/2007 | Furuuchi | |
| 7,535,332 | B2 | 5/2009 | Furuuchi et al. | |
| 8,531,263 | B2 | 9/2013 | Dietsch et al. | |
| 2010/0245024 | A1 | 9/2010 | Furuuchi et al. | |
| 2010/0245027 | A1 * | 9/2010 | Matthiesen | H01H 37/761 337/297 |
| 2012/0001720 | A1 | 1/2012 | Kimura et al. | |
| 2015/0145637 | A1 | 5/2015 | Nitta et al. | |
| 2015/0364286 | A1 | 12/2015 | Kang et al. | |

FOREIGN PATENT DOCUMENTS

| | | | |
|---|---|---|---|
| JP | H04-365304 A | 12/1992 | |
| JP | H09-161635 A | 6/1997 | |
| JP | H09-219138 A | 8/1997 | |
| JP | 2001-057139 A | 2/2001 | |
| JP | 2004-185960 A | 7/2004 | |
| JP | 2006-221919 A | 8/2006 | |
| JP | 2007-109566 A | 4/2007 | |
| JP | 2008-112735 A | 5/2008 | |
| JP | 2009-301964 A | 12/2009 | |
| JP | 2010-003665 A | 1/2010 | |
| JP | 2010-170801 A | 8/2010 | |
| JP | 2011-175958 A | 9/2011 | |
| JP | 2011-222264 A | 11/2011 | |
| JP | 2012-003878 A | 1/2012 | |
| WO | 2013/059604 A1 | 4/2013 | |
| WO | WO-2013059604 A1 * | 4/2013 | ............. H01H 69/02 |

OTHER PUBLICATIONS

Aug. 24, 2016 Office Action issued in U.S. Appl. No. 14/387,797.
Dec. 21, 2016 Office Action issued in U.S. Appl. No. 14/387,797.
Nov. 21, 2017 Office Action issued in U.S. Appl. No. 14/387,797.
Mar. 13, 2018 Notice of Allowance issued in U.S. Appl. No. 14/387,797.
May 8, 2017 Office Action issued in U.S. Appl. No. 14/387,797.
May 28, 2013 International Search Report issued in International Application No. PCT/JP2013/059013 with translation.

* cited by examiner

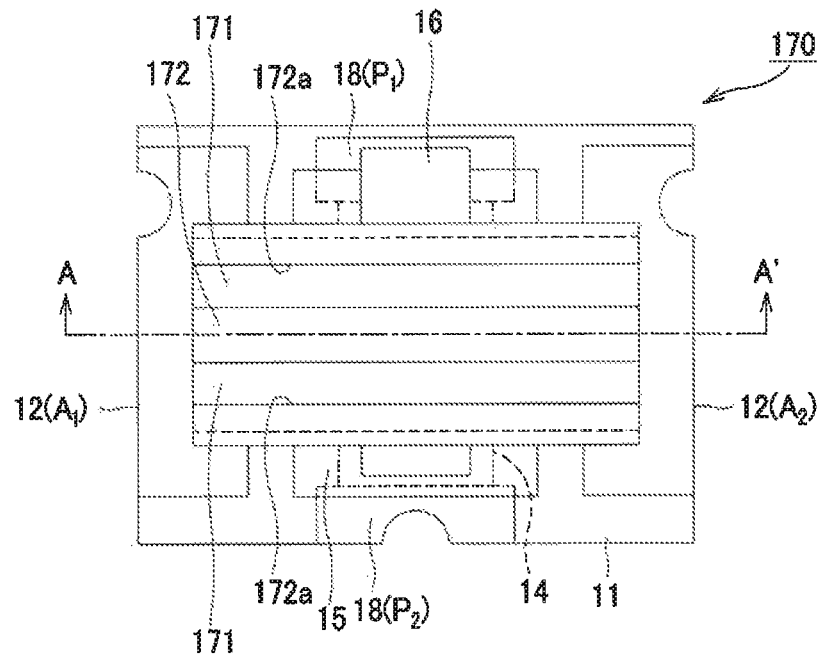
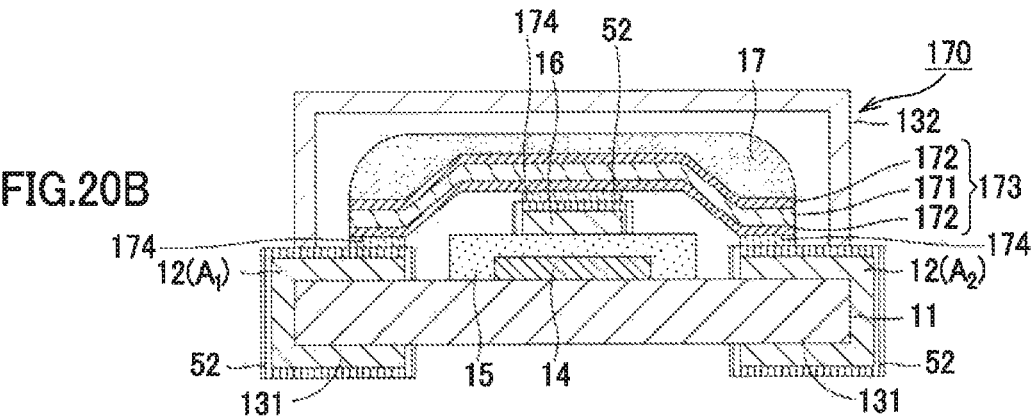

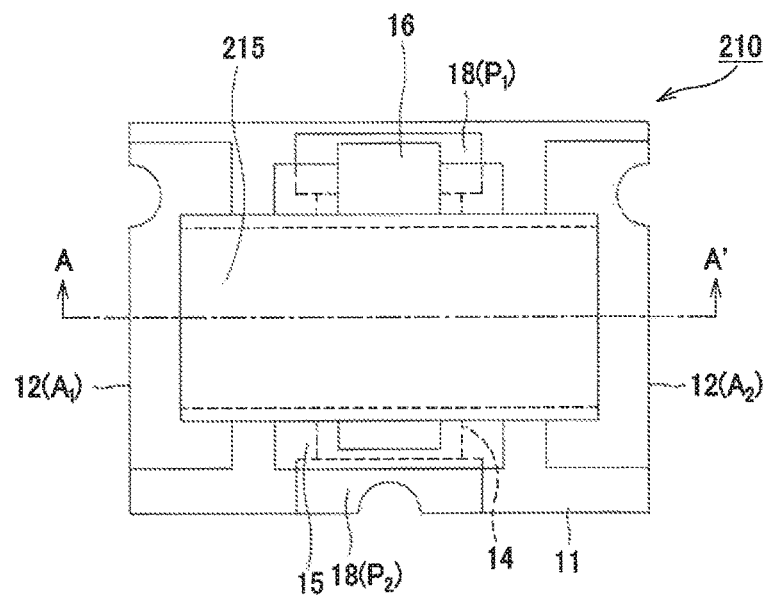
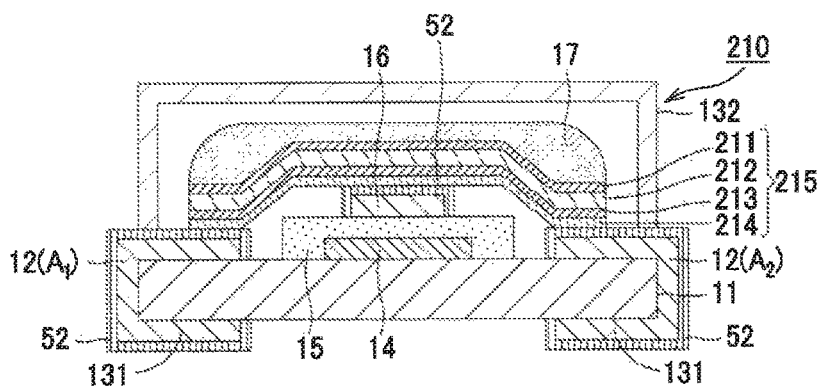

PROTECTION ELEMENT

This application is a continuation application of U.S. patent application Ser. No. 14/387,797 filed Sep. 24, 2014, which is in turn a U.S. National Stage of International Application No. PCT/JP2013/059013 filed Mar. 27, 2013, which claims the benefit of Japanese Patent Application No. 2013-008302 filed Jan. 21, 2013, Japanese Patent Application No. 2012-281452 filed Dec. 25, 2012, and Japanese Patent Application No. 2012-076928 filed Mar. 29, 2012. The disclosure of the prior applications is hereby incorporated by reference herein in their entirety.

FIELD OF THE INVENTION

The present invention relates to a protection element which fuses a current path to stop charging a battery connected on the current path, thereby controlling thermal runaway of the battery.

BACKGROUND OF THE INVENTION

Most of secondary batteries, which are capable of being charged and thereby repeatedly used, are processed to be in the form of a battery pack and provided to users. In order to secure the safety of users and electronic devices, particularly in a lithium ion secondary battery having high weight energy density, some protection circuits for overcharge protection, overdischarge protection, and the like are generally built in a battery pack, and said battery has a function capable of interrupting the output of the battery pack in a predetermined case.

Using an FET switch built in the battery pack, the output thereof is turned on and off, whereby an overcharge protection operation or an overdischarge protection operation of the battery pack is performed. However, in the case where the FET switch is short-circuited and broken due to some reason; in the case where application of a lightning surge or the like causes a high current to instantly flow; or in the case where an output voltage extraordinarily decreases due to the life of a battery cell, or, on the contrary, in the case where excessive voltage is outputted, the battery pack and the electronic device must be protected from accidents, such as fire accidents. Therefore, in order to safely interrupt the output of a battery cell in any thus-postulated abnormal situation, a protection element comprising a fuse element has a function to interrupt a current path using an external signal.

As disclosed in Patent Literature 1, for such protection element of a protection circuit for lithium ion secondary batteries and the like, there has been generally employed a structure which has a heating body inside a protection element and a fusible conductor on a current path using this heating body.

PRIOR ART DOCUMENTS

Patent Document

PTL 1: Japanese Patent Application Laid-Open No. 2010-003665
PTL 2: Japanese Patent Application Laid-Open No. 2004-185960
PTL 3: Japanese Patent Application Laid-Open No. 2012-003878

SUMMARY OF THE INVENTION

In the protection element disclosed in Patent Literature 1, Pb-containing solder having a high melting point of not less than 300 degrees C. is generally used for a fusible conductor so that, when reflow mounting is applied, the fusible conductor is not melted by the heat of the reflow. However, in RoHS Directive and the like, the use of Pb-containing solder is only limitedly permitted, and accordingly demand for Pb-free soldering is expected to intensify.

Here it should be noted that "solder erosion" and " erosion phenomenon" have been ever well known as a phenomenon in which Au plating or Ag plating of electronic parts or the like begins to melt into molten solder, and Patent Literature 2 discloses a protection element provided as a Pb-free soldering material obtained by taking advantage of this phenomenon. However, as described in Patent Literature 2, there is a problem associated with a structure in which a high melting point metal layer arranged so as to closely adhere to an insulating layer leads only to an erosion phenomenon of the high melting point metal layer caused by melting of a low melting point metal layer, and sometimes fails in complete interruption of a circuit. Furthermore, in order to surely fuse a fusible conductor, it is preferable to form a slit, a film thickness level difference, or the like in a high melting point metal layer or the like, but, there is a problem associated with an increased step for formation of a slit or a film thickness level difference (for example, refer to Patent Literature 3).

Then, the present invention aims to achieve a Pb-free protection element by using a layered body comprising a high melting point metal layer and a low melting point metal layer.

To solve the above-mentioned problems, a protection element according to an embodiment of the present invention comprises: an insulating substrate; a heating body laminated on the insulating substrate; an insulating member laminated on the insulating substrate so as to cover at least the heating body; first and second electrodes laminated on the insulating substrate having the insulating member laminated thereon; a heating body extraction electrode laminated on the insulating member so as to be superimposed with the heating body, and electrically connected to the heating body on a current path between the first and second electrodes; and a fusible conductor laminated over a range from the heating body extraction electrode to the first and second electrodes, and fusing the current path between the first and second electrodes by heating. Furthermore, the fusible conductor comprises a layered body including a high melting point metal layer and a low melting point metal layer, and the low melting point metal layer is melted by a heat generated by the heating body, whereby, while eroding the high melting point metal layer, the low melting point metal layer is drawn close to the side of the first and second electrodes and the heating body extraction electrode, and fused, said first and second electrodes and said heating body extraction electrode each having high wettability.

It is preferable that the low melting point metal layer is made of a Pb-free solder, meanwhile the high melting point metal layer is made of a metal containing Ag or Cu as a main component.

Furthermore, the volume of the low melting point metal layer is preferably larger than the volume of the high melting point metal layer.

A protection element according to another embodiment of the present invention comprises: an insulating substrate; a heating body laminated on the insulating substrate; an insulating member laminated on the insulating substrate so as to cover at least the heating body; first and second electrodes laminated on the insulating substrate having the insulating member laminated thereon; a heating body extraction electrode electrically connected to the heating body on a current path between the first and second electrodes; and a fusible conductor laminated over a range from the heating body extraction electrode to the first and second electrodes, and fusing the current path between the first and second electrodes by heating. Furthermore, the fusible conductor comprises a layered body including at least a high melting point metal layer and a low melting point metal layer. The low melting point metal layer is melted a heat generated by the heating body, whereby, while eroding the high melting point metal layer, the low melting point metal layer is drawn close to the side of the first and second electrodes and the heating body extraction electrode, and fused, said first and second electrodes and said heating body extraction electrode each having high wettability for the low melting point metal.

A protection element according to another embodiment of the present invention comprises: an insulating substrate; a heating body laminated on the insulating substrate; an insulating member laminated on the insulating substrate so as to cover at least the heating body; first and second electrodes laminated on the insulating substrate having the insulating member laminated thereon; a heating body extraction electrode electrically connected to the heating body on a current path between the first and second electrodes; and a plurality of fusible conductors laminated over a range from the heating body extraction electrode to the first and second electrodes, and fusing the current path between the first and second electrodes by heating. Furthermore, each of the fusible conductors comprises a layered body including at least a high melting point metal layer and a low melting point metal layer. The low melting point metal layer is melted a heat generated by the heating body, whereby, while eroding the high melting point metal layer, the low melting point metal layer is drawn close to the side of the first and second electrodes and the heating body extraction electrode, and fused, said first and second electrodes and said heating body extraction electrode each having high wettability for a low melting point metal.

A protection element according to another embodiment of the present invention comprises: an insulating substrate; a heating body built inside the insulating substrate; first and second electrodes laminated on the insulating substrate; a heating body extraction electrode electrically connected to the heating body on a current path between the first and second electrodes; and a fusible conductor laminated over a range from the heating body extraction electrode to the first and second electrodes, and fusing the current path between the first and second electrodes by heating of the heating body. Furthermore, the fusible conductor comprises a layered body including at least a high melting point metal layer and a low melting point metal layer. The low melting point metal layer is melted by a heat generated by the heating body, whereby, while eroding the high melting point metal layer, the low melting point metal layer is drawn close to the side of the first and second electrodes and the heating body extraction electrode, and fused, said first and second electrodes and said heating body extraction electrode each having high wettability for the low melting point metal.

A protection element according to another embodiment of the present invention comprises: an insulating substrate; a heating body laminated on the insulating substrate; first and second electrodes laminated on a surface of the insulating substrate opposite to a surface thereof on which the heating body is laminated; a heating body extraction electrode electrically connected to the heating body on a current path between the first and second electrodes; and a fusible conductor laminated over a range from the heating body extraction electrode to the first and second electrodes, and fusing the current path between the first and second electrodes by heating of the heating body. Furthermore, the fusible conductor comprises a layered body including at least a high melting point metal layer and a low melting point metal layer. The low melting point metal layer is melted by a heat generated by the heating body, whereby, while eroding the high melting point metal layer, the low melting point metal layer is drawn close to the side of the first and second electrodes and the heating body extraction electrode, and fused, said first and second electrodes and said heating body extraction electrode each having high wettability for the low melting point metal.

A protection element according to another embodiment of the present invention comprises: an insulating substrate; a heating body laminated on the insulating substrate; first and second electrodes laminated on the same surface of the insulating substrate as a surface thereof on which the heating body is laminated; a heating body extraction electrode electrically connected to the heating body on a current path between the first and second electrodes; and a fusible conductor laminated over a range from the heating body extraction electrode to the first and second electrodes, and fusing the current path between the first and second electrodes by heating of the heating body. Furthermore, the fusible conductor comprises a layered body including at least a high melting point metal layer and a low melting point metal layer. The low melting point metal layer is melted by a heat generated by the heating body, whereby, while eroding the high melting point metal layer, the low melting point metal layer is drawn close to the side of the first and second electrodes and the heating body extraction electrode, and fused, said first and second electrodes and said heating body extraction electrode each having high wettability for the low melting point metal.

A protection element according to another embodiment of the present invention comprises: an insulating substrate; first and second electrodes laminated on the insulating substrate; a heating body extraction electrode laminated on a current path between the first and second electrodes; a heating element incorporated so as to be electrically connected to the heating body extraction electrode; and a fusible conductor laminated over a range from the heating body extraction electrode to the first and second electrodes, and fusing the current path between the first and second electrodes by heating of the heating element. Furthermore, the fusible conductor comprises a layered body including at least a high melting point metal layer and a low melting point metal layer. The low melting point metal layer is melted by a heat generated by the heating body melts, whereby, while eroding the high melting point metal layer, the low melting point metal layer is drawn close to the side of the first and second electrodes and the heating body extraction electrode, and fused, said first and second electrodes and said heating body extraction electrode each having high wettability for the low melting point metal.

A protection element according to another embodiment of the present invention comprises: an insulating substrate; a heating body laminated on the insulating substrate; an insulating member laminated on the insulating substrate so as to cover at least the heating body; first and second electrodes laminated on the insulating substrate having the insulating member laminated thereon; a heating body extraction electrode electrically connected to the heating body on a current path between the first and second electrodes; and a fusible conductor laminated over a range from the heating body extraction electrode to the first and second electrodes, and fusing the current path between the first and second electrodes by heating. Furthermore, the fusible conductor is made of a high melting point metal and connected to each of the first electrode, the second electrode, and the heating body extraction electrode via a low melting point metal. The low melting point metal layer is melted by a heat generated by the heating body, whereby, while eroding the fusible conductor made of the high melting point metal, the low melting point metal layer is drawn close to the side of the first and second electrodes and the heating body extraction electrode, and fused, said first and second electrodes and said heating body extraction electrode each having high wettability for the low melting point metal.

EFFECTS OF INVENTION

In a protection element according to the present invention, when a fusible conductor comprising a layered body including a high melting point metal layer and a low melting point metal layer is heated, a heat generated by a heating body melts the low melting point metal layer, whereby, while eroding the high melting point metal layer, the low melting point metal layer is drawn close to the side of the first and second electrodes and the heating body extraction electrode, and fused, said first and second electrodes and said heating body extraction electrode each having high wettability, and thus the fusing can be surely performed. Furthermore, it is clear that a protection element according to the present invention has a fusible conductor and thereby also functions as a usual current fuse, and can realize interruption of both a current path for an external signal and a current path for an overcurrent.

Furthermore, the low melting point metal layer is made of Pb-free solder, meanwhile the high melting point metal layer is made of a metal containing Ag or Cu as a main component, and therefore, a demand for Pb-free can be satisfied.

Since the volume of the low melting point metal layer is made larger than the volume of the high melting point metal layer, the high melting point metal layer can be effectively eroded.

BRIEF DESCRIPTION OF DRAWINGS

FIG. 5A is a plan view illustrating a protection element before and just after an operation thereof FIG. 5B is a plan view illustrating a state in which a low melting point metal layer in the vicinity of a heat source is melted by a heating operation and is eroding a high melting point metal layer.

FIG. 9A is a plan view illustrating the protection element before and just after the operation thereof FIG. 9B is a plan view illustrating a state in which a low melting point metal layer in the vicinity of a heat source is melted by a heating operation and thereby is eroding a high melting point metal layer. FIG. 9C is a plan view illustrating a state in which erosion of the high melting point metal layer is proceeding. FIG. 9D is a plan view illustrating a state in which the low melting point metal layer has been drawn close to electrodes and a heating body extraction electrode.

FIG. 10A illustrates an example of a fusible conductor having a rectangular parallelepiped shape (a cube shape), on the other hand, FIG. 10B illustrates an example of a fusible conductor having a cylindrical shape.

FIGS. 20A and 20B illustrate a modified example of a protection element using a fusible conductor in which a linear opening portion is provided to a high melting point metal layer so that a low melting point metal layer is exposed therefrom, and FIG. 20A is a plan view thereof, meanwhile FIG. 20B is a cross-sectional view thereof.

FIG. 21A is a plan view thereof, meanwhile FIG. 21B is a cross-sectional view thereof.

FIG. 22A is a plan view thereof, meanwhile FIG. 22B is a cross-sectional view thereof.

FIG. 23A is a plan view thereof, meanwhile FIG. 23B is a cross-sectional view thereof.

FIGS. 24A and 24B illustrate a modified example of a protection element using a fusible conductor having a four-layer structure in which high melting point metal layers and low melting point metal layers are alternately laminated, and FIG. 24A is a plan view thereof, meanwhile FIG. 24B is a cross-sectional view thereof.

FIG. 25A is a plan view thereof, meanwhile FIG. 25B is a cross-sectional view thereof.

DETAILED DESCRIPTION OF THE INVENTION

Hereinafter, an embodiment according to the present invention will be described in detail with reference to the drawings. It should be noted that the present invention is not limited only to the following embodiment, and it is a matter of course that various changes can be made within the scope not deviating from the gist of the present invention.

[Configuration of Protection Element]

Figure 1A:
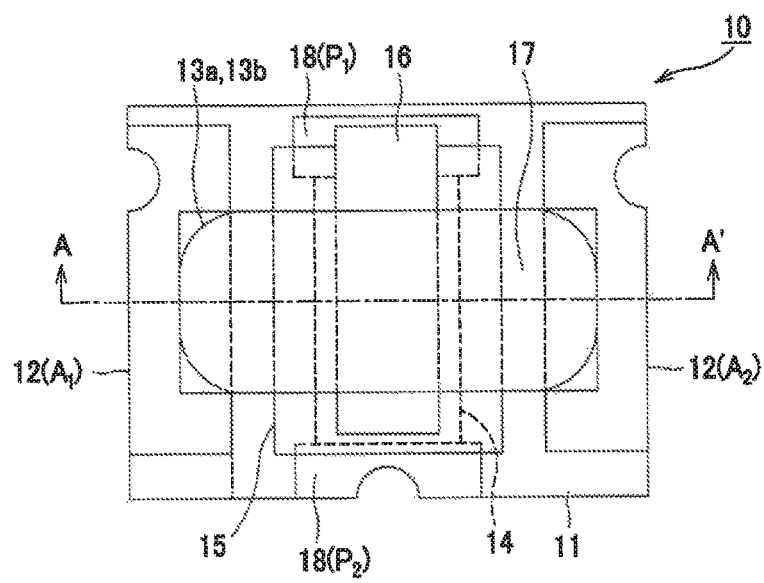
FIG. 1A is a plan view of a protection element according to the present invention.
Figure 1B:
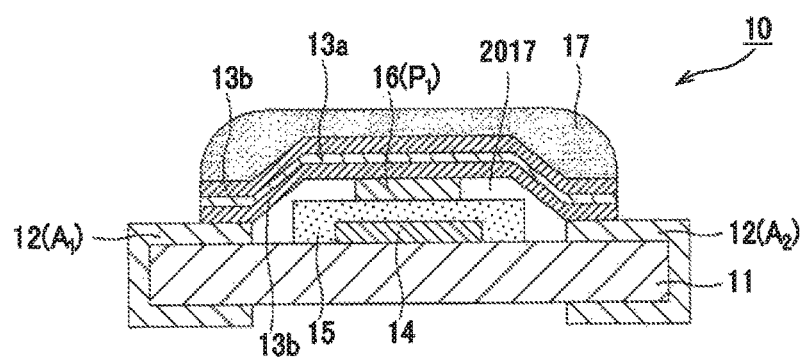
FIG. 1B is a cross-sectional view of section A-A' of FIG. 1A.

As shown in FIG. 1, a protection element 10 according to the present invention comprises: an insulating substrate 11; a heating body 14 laminated on the insulating substrate 11 and covered with an insulating member 15; electrodes 12(A1) and 12(A2) formed at both ends of the insulating substrate 11; a heating body extraction electrode 16 laminated on the insulating member 15 so as to be superimposed with the heating body 14; and a fusible conductor 13 each end of which is connected to the corresponding one of electrodes 12 (A1) and 12 (A2) and a center portion of which is connected to the heating body extraction electrode 16. As shown in FIG. 1B, the fusible conductor 13 is otherwise separated from the insulating member 15 and the insulating substrate 11 by a gap 2017. Furthermore, external terminals connected to the electrodes 12 (A1) and 12 (A2) are formed on a back surface of the insulating substrate 11.

The insulating substrate 11 having a rectangular parallelepiped shape is made of, for example, a material having insulating properties, such as alumina, glass ceramics, mullite, or zirconia. Besides, a material used for printed-circuit boards, such as a glass epoxy board and a phenol board, may be used, but, it is necessary to care about a temperature for fusing.

The heating body 14 is made of an electrically-conductive material such as W, Mo, or Ru, which has a comparatively high resistance and generates heat when energized. The heating body 14 is formed in such a manner that a powder of an alloy, a composite, or a compound of the above-mentioned material is mixed with a resin binder or the like to be made into a paste, and, with the obtained paste, a pattern is formed on the insulating substrate 11 by screen printing technique, and baking is performed.

The insulating member 15 is arranged so as to cover the heating body 14, and the heating body extraction electrode 16 is arranged so as to face the heating body 14 via said insulating member 15. In order to efficiently conduct the heat of the heating body 14 to the fusible conductor, the insulating member 15 may be laminated between the heating body 14 and the insulating substrate 11.

One end of the heating body extraction electrode 16 is connected to a heating body electrode 18(P1). Furthermore, one end of the heating body 14 is connected to another heating body electrode 18(P2).

The fusible conductor 13 is a layered structure body comprising an internal layer and an external layer, preferably has a high melting point metal layer 13a as the internal layer and a low melting point metal layer 13b as the external layer. It should be noted that, as mentioned later, the fusible conductor 13 may have the low melting point metal layer 13b as an internal layer and the high melting point metal layer 13a as an external layer. Furthermore, the fusible conductor 13 may have a two-layer structure body composed of an upper layer and a lower layer, and may have the high melting point metal layer 13a as the upper layer and the low melting point metal layer 13b as the lower layer. The high melting point metal layer 13a is preferably made of Ag or Cu, or a metal containing any one of Ag and Cu as a main component, and has a melting point high enough not to melt even when a substrate is mounted by a reflow furnace. The low melting point metal layer 13b is preferably made of a metal containing Sn as a main component, the metal being a material generally called "Pb-free solder" (for example, M705, manufactured by Senju Metal Industry Co., Ltd.). The melting point of the low melting point metal layer 13b does not necessarily need to be higher than the temperature of the reflow furnace, and the low melting point metal layer 13b may melt at approximately 200 degrees C. Lamination of the high melting point metal layer 13a and the low melting point metal layer 13b prevents the fusible conductor 13 from being fused even in the case where the reflow temperature exceeds a melting temperature of the low melting point metal layer 13b, whereby a low melting point metal melts. The fusible conductor 13 may be formed by film-formation of the low melting point metal layer 13b on the high melting point metal layer 13a, by using a plating technique. Alternatively, the fusible conductor 13 may be formed by laminating the low melting point metal layer 13b on the high melting point metal layer 13a, by using another well-known technique, such as a lamination technique or a film formation technique. Furthermore, on the contrary, also in the case where the high melting point metal layer 13a is made to serve as an external layer, the same film formation technique can be applied to form the fusible conductor 13. It should be noted that solder jointing by using the low melting point metal layer 13b allows the fusible conductor 13 to be connected to the heating body extraction electrode 16 and the electrodes 12(A1) and 12(A2).

To prevent the low melting point metal layer 13b serving as an external layer from being oxidized, a flux 17 may be applied to almost the entire surface of the fusible conductor 13.

To protect the inside of the protection element 10 having such configuration, a cover member may be arranged on the insulating substrate 11.

[Method for Use of Protection Element]

Figure 2:
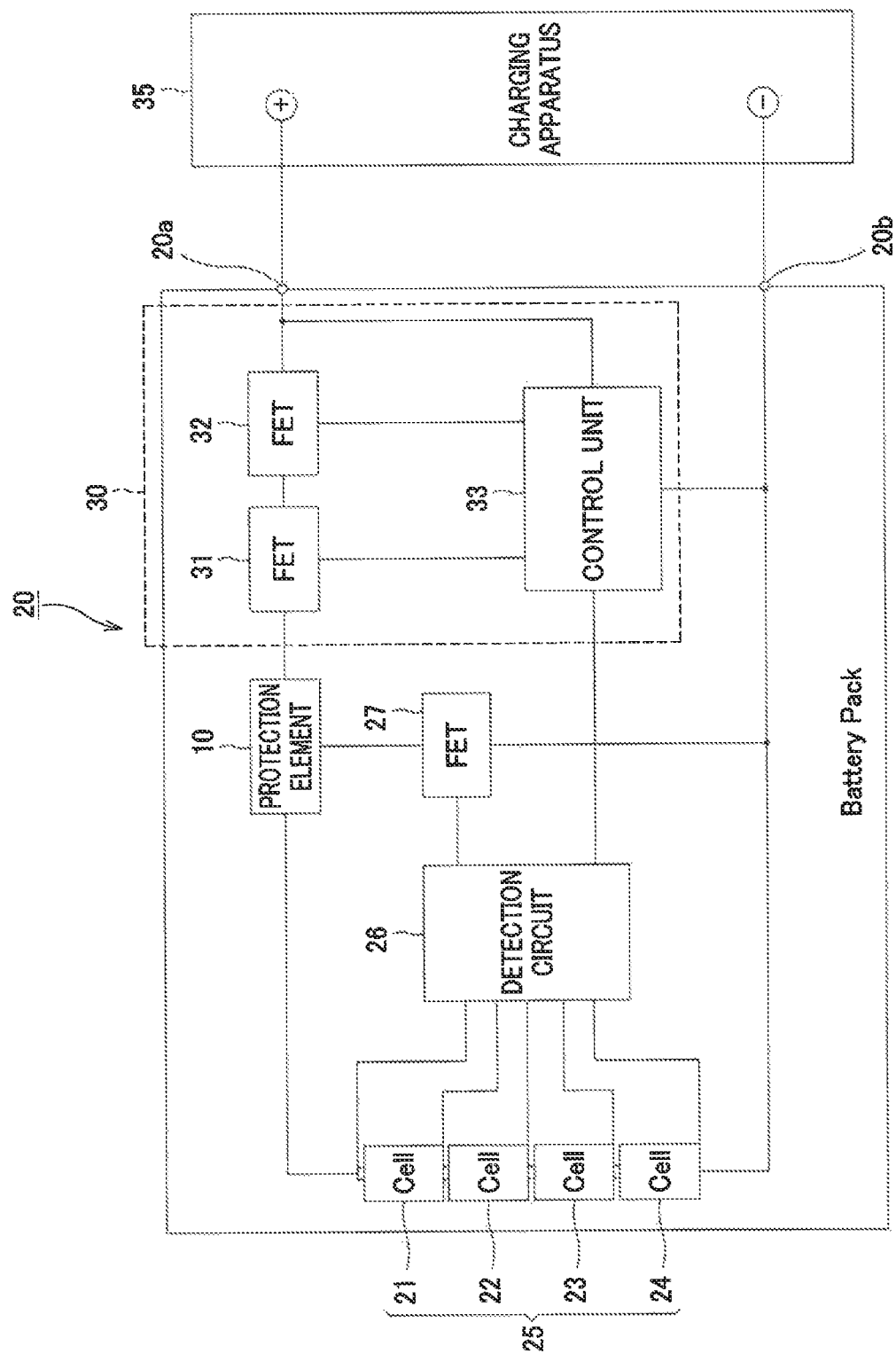
FIG. 2 is a block diagram illustrating an example of a protection element of the application of the present invention.

As shown in FIG. 2, the above-mentioned protection element 10 is used for a circuit in a battery pack of a lithium ion secondary battery.

For example, the protection element 10 is used by being incorporated into a battery pack 20 having a battery stack 25 comprising four battery cells 21 to 24 in total for a lithium ion secondary battery.

The battery pack 20 comprises: the battery stack 25; a charge-and-discharge control circuit 30 configured to control charging and discharging of the battery stack 25; the protection element 10 according to the present invention configured to interrupt charging at the time of occurrence of abnormality in the battery stack 25; a detection circuit 26 configured to detect the voltage of each of the battery cells 21 to 24; and a current control element 27 configured to control the operation of the protection element 10 depending on a detection result of the detection circuit 26.

The battery stack 25 comprises the battery cells 21 to 24 which are serially connected and require a control for protection from overcharge and overdischarge states, and the battery stack 25 is removably connected to a charging apparatus 35 via a positive electrode terminal 20a and a negative electrode terminal 20b of the battery pack 20, and a charging voltage from the charging apparatus 35 is applied thereon. The positive electrode terminal 20a and the negative electrode terminal 20b of the battery pack 20 charged by the charging apparatus 35 are connected to an electronic device which operates with a battery, whereby this electronic device can be operated.

The charge-and-discharge control circuit 30 comprises: two current control elements 31 and 32 which are serially connected in a current path flowing from the battery stack 25 to the charging apparatus 35; and a control unit 33 configured to control the operation of said current control elements 31 and 32. The current control elements 31 and 32 are configured with, for example, field-effect transistors (hereinafter, referred to as FET), and a gate voltage is controlled by the control unit 33, whereby continuity and interruption of the current path of the battery stack 25 are controlled. The control unit 33 operates in response to an electric power supply from the charging apparatus 35, and, depending on a detection result of the detection circuit 26, when the battery stack 25 is in an overdischarge state or in an overcharge state, the operations of the current control elements 31 and 32 are controlled so as to interrupt the current path.

The protection element 10 is, for example, connected on the charge-and-discharge current path between the battery stack 25 and the charge-and-discharge control circuit 30, and the operation of the protection element 10 is controlled by the current control element 27.

The detection circuit 26 is connected to each of the battery cells 21 to 24, and detects a voltage value of each of the battery cells 21 to 24 to provide each of the voltage values to the control unit 33 of the charge-and-discharge control circuit 30. Furthermore, the detection circuit 26 outputs a control signal to control the current control element 27 when any one of the battery cells 21 to 24 has an overcharge voltage or an overdischarge voltage.

The current control element 27 is configured with, for example, FET, and, when, based on a detection signal outputted from the detection circuit 26, it is detected that a voltage value of any of the battery cells 21 to 24 exceeds a predetermined overdischarge voltage or a predetermined overcharge voltage, the current control element 27 operates the protection element 10 and controls so as to interrupt the charge-and-discharge current path of the battery stack 25, not depending on switching operation of the current control elements 31 and 32.

The configuration of the protection element 10 in the battery pack 20 having the above-mentioned configuration will be specifically described.

Figure 3:
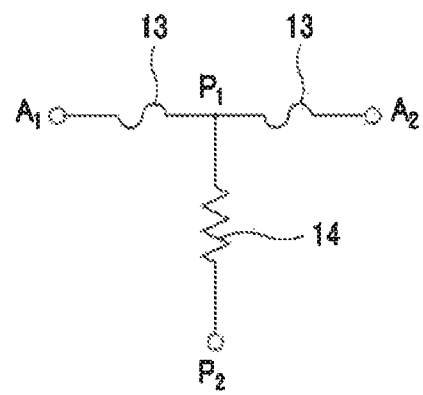
FIG. 3 illustrates an example of a circuit configuration of a protection element according to the present invention.

First, the protection element 10 according to the present invention has a circuit configuration as shown in FIG. 3, for example. That is, the protection element 10 has a circuit configuration comprising: the fusible conductor 13 serially connected via the heating body extraction electrode 16; and the heating body 14 configured to melt the fusible conductor 13 by heat generation caused by passing current connecting points to the fusible conductor 13. Furthermore, in the protection element 10, for example, the fusible conductor 13 is serially connected on a charge-and-discharge current path, and the heating body 14 is connected to the current control element 27. One of the two electrodes 12 of the protection element 10 is connected to A1, meanwhile the other one is connected to A2. Furthermore, the heating body extraction electrode 16 and one of the heating body electrodes 18 connected to said heating body extraction electrode 16 are connected to P1, meanwhile another one of the heating body electrodes 18 is connected to P2.

The protection element 10 having such circuit configuration is shorter in height and Pb-free, meanwhile the protection element 10 can surely fuse the fusible conductor 13 on a current path by heat generation of the heating body 14.

It should be noted that the protection element according to the present invention can be not only used for a battery pack of a lithium ion secondary battery, but also applied to various uses requiring interruption of a current path by an electric signal.

[Operation of Protection Element]

First, for a comparison, a known example (Japanese Patent Application Laid-Open No. 2004-185960) will be taken up as an example of a conventional protection element to describe the configuration thereof.

Figure 4:
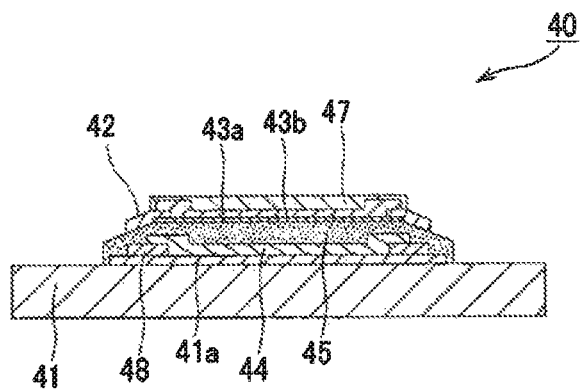
FIG. 4 is a cross-sectional view of a protection element of a known example (Japanese Patent Application Laid-Open No. 2004-185960).

As shown in FIG. 4, in a protection element 40 according to the prior art, a glass layer 41a is formed as an insulating base layer on a rectangular substrate 41, and a heating body 44 is laminated on the glass layer 41a. An insulating member 45 is formed so as to cover the heating body 44, and a high melting point metal layer 43a is laminated so as to face the heating body 44 via the insulating member 45, and, furthermore, a low melting point metal layer 43b is laminated thereon. Electrodes 42 are laminated at and connected to both ends of the high melting point metal layer 43a and the low melting point metal layer 43b so as to be sandwiched between the high melting point metal layer 43a and the low melting point metal layer 43b. A flux 47 is applied on the low melting point metal layer 43b.

As mentioned above, in the protection element 40 according to the prior art, the whole of the high melting point metal layer 43a is formed so as to directly come into full contact with the insulating member 45. In this configuration, circuit interruption is performed only by an action in which the low melting point metal layer 43b is melted by heat generation of the heating body 44, and thereby erodes the high melting point metal layer 43a. Even if the interruption is not perfectly done, at the time when the fusible conductor has a high resistance, the passage of a current to the heating body 44 is controlled, whereby the heat generation is stopped. In other words, sometimes the circuit cannot be perfectly interrupted.

In the protection element 10 according to the present invention as shown in FIG. 1, the high melting point metal layer 13a and the low melting point metal layer 13b are connected to the heating body extraction electrode 16 and the electrode 12 so as to straddle a space between the heating body extraction electrode 16 and the electrode 12. Therefore, in addition to an action of eroding the high melting point metal layer by melting the low melting point metal layer 13b, a physical extraction action caused by surface tension of the molten low melting point metal layer 13b on each of the connected electrodes 12 allows the fusible conductor 13 to be surely fused.

Hereinafter, the operation of the protection element 10 according to the present invention will be described.

FIGS. 5A-5D schematically illustrate how the fusible conductor 13 acts when a current is made to pass through the heating body 14 of the protection element 10 as shown in FIG. 1.

Figure 5A:
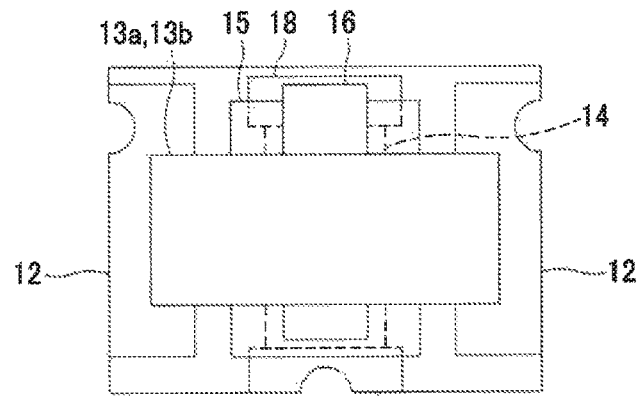
FIGS. 5A-5B are schematic plan views for describing an operation of a protection element according to the present invention.

FIG. 5A illustrates a state before passing a current through the heating body 14 and at the beginning of the start of said passage of a current by connecting a power source so as to apply a voltage between the heating body electrode 18(P2) and the electrodes 12(A1), (A2). The resistance of the heating body 14 is preferably set according to an applied voltage so that the temperature of heat generated by the heating body 14 is higher than a usual reflow temperature (not more than 260 degrees C.), that is, not less than 300 degrees C.

Figure 5B:
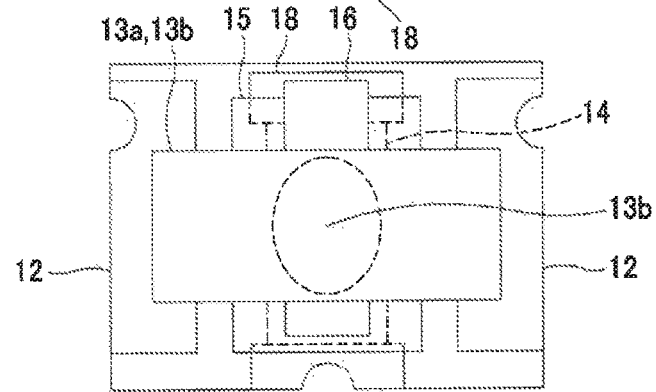

As shown in FIG. 5B, the low melting point metal layer 13b as an external layer of the fusible conductor 13 arranged right above the heating body 14 starts melting, and the molten low melting point metal diffuses into the high melting point metal layer 13a serving as an internal layer, whereby an erosion phenomenon is caused and the high melting point metal layer 13a is eroded and disappears. Inside the circle with broken line, there is a state in which the high melting point metal layer 13a has disappeared and been mingled with the molten low melting point metal layer 13b.

Figure 5C:
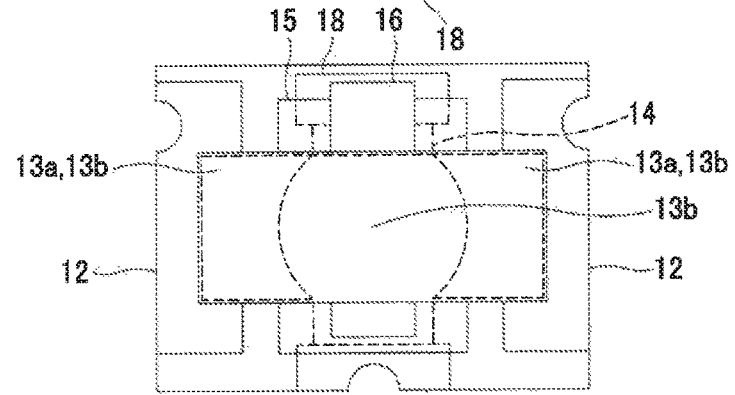
FIG. 5C is a plan view illustrating a state in which erosion of the high melting point metal layer is proceeding.
Figure 5D:
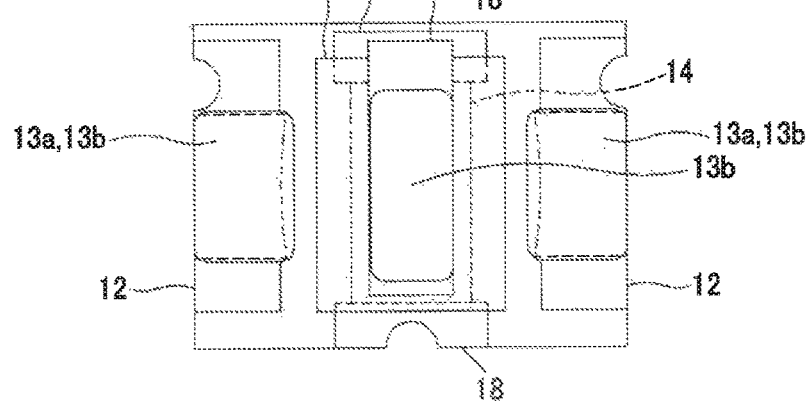
FIG. 5D is a plan view illustrating a state in which the low melting point metal layer has been drawn close to electrodes and a heating body extraction electrode.

As shown in FIG. 5C, the temperature of the heating body 14 further rises, whereby there is expanded an area of the high melting point metal layer 13a eroded by melting of the low melting point metal layer 13b serving as an external layer of the fusible conductor 13. In this state, adoption of a metal having a high thermal conductivity as a material of the high melting point metal layer 13a allows an area including the electrodes 12 to have a high temperature, whereby the whole of the low melting point metal layer 13b is in a molten state. At this time, when the high melting point metal layer 13a is completely eroded on the heating body extraction electrode 16, the low melting point metal layer 13b, that is, solder is drawn closed to each of the heating body extraction electrode 16 and the two electrodes 12(A1) and 12(A2) because of its wettability (surface tension), as shown in FIG. 5D. As a result, interruption between each of the electrodes is completed.

MODIFIED EXAMPLE 1

Figure 6A:
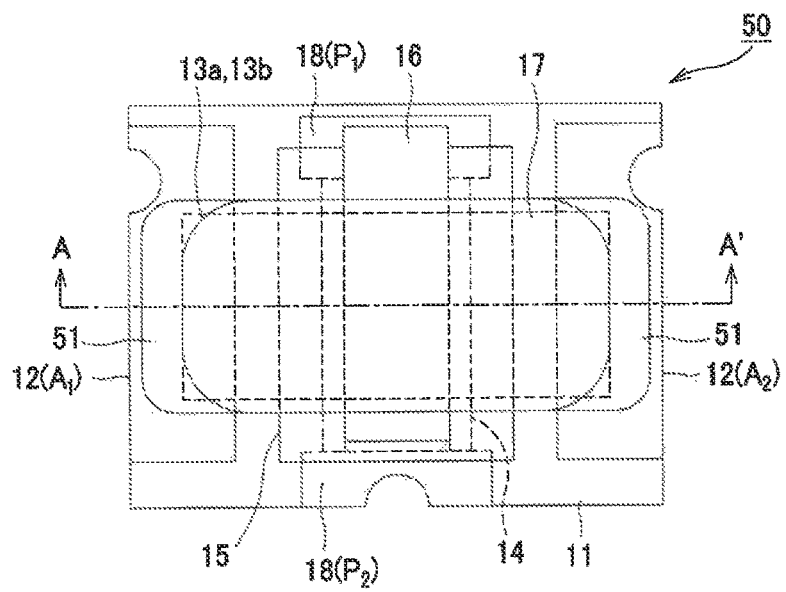
FIG. 6A is a plan view illustrating a modified example of the embodiment of a protection element according to the present invention.
Figure 6B:
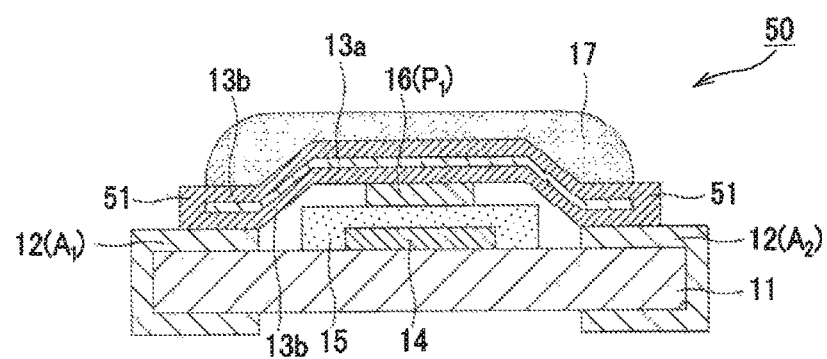
FIG. 6B is a cross-sectional view of section A-A' of FIG. 6A.

As shown in FIG. 6, a protection element 50 of a modified example according to the present invention comprises: an insulating substrate 11; a heating body 14 laminated on the insulating substrate 11 and covered with an insulating member 15; electrodes 12(A1) and 12(A2) formed at both ends of the insulating substrate 11; a heating body extraction electrode 16 laminated on the insulating member 15 so as to be superimposed with the heating body 14; and a fusible conductor 13 each end of which is connected to the corresponding one of electrodes 12 (A1) and 12 (A2) and a center portion of which is connected to the heating body extraction electrode 16. Furthermore, external terminals connected to the electrodes 12(A1) and 12(A2) are formed on a back surface of the insulating substrate 11.

In the case of a fusible conductor which uses common higher melting point solder (Pb-containing solder), the fusible conductor has a low thermal conductivity, and therefore, the temperatures of electrode portions at both ends of the protection element cannot reach a melting temperature in a short time. On the other hand, in the case of the fusible conductor in the protection element according to the present invention, the fusible conductor having a high melting point metal layer made of Ag or Cu, or a metal containing any one of Ag and Cu as a main component, the fusible conductor has a high thermal conductivity, and therefore, in order that also the temperatures of electrode portions at both ends of the protection element sufficiently reach a melting temperature of a low melting point metal layer, a solder accumulation portion mentioned later is provided so that more stable fusion characteristics can be achieved.

The fusible conductor 13 is a layered structure body comprising an internal layer and an external layer, preferably has a high melting point metal layer 13a as an internal layer and a low melting point metal layer 13b as an external layer. Alternatively, the fusible conductor 13 may have the low melting point metal layer 13b as an internal layer and the high melting point metal layer 13a as an external layer. The high melting point metal layer 13a is preferably made of Ag or Cu, or a metal containing any one of Ag and Cu as a main component, and preferably has a melting point high enough not to melt even when a substrate is mounted by a reflow furnace. The low melting point metal layer 13b is preferably made of a metal containing Sn as a main component, the metal being a material generally called "Pb-free solder" (for example, M705, manufactured by Senju Metal Industry Co., Ltd.). The melting point of the low melting point metal layer 13b does not necessarily need to be higher than the temperature of the reflow furnace, and the low melting point metal layer 13b may melt at approximately 200 degrees C. The fusible conductor 13 may be formed by film-formation of the low melting point metal layer 13b on the high melting point metal layer 13a by using plating technique. Alternatively, the fusible conductor 13 may be formed by laminating the low melting point metal layer 13b on the high melting point metal layer 13a by using another well-known lamination technique or film formation technique. Furthermore, on the contrary, also in the case where the high melting point metal layer 13a is made to serve as an external layer, the same film formation technique can be applied to form the fusible conductor 13.

Here, solder accumulation portions 51 made of the same material as the low melting point metal layer 13b are provided at both ends of the fusible conductor 13 to which the electrodes 12(A1) and 12(A2) are connected. At the time of an operation of the protection element, the low melting point metal layer 13b including the accumulation portions 51 is in a fully molten state. When the high melting point metal layer 13a is eroded in the whole of the fusible conductor 13, the molten fusible conductor 13 is easily drawn close to each of the accumulation portions 51 and 51 at the corresponding one of the electrodes 12(A1) and 12(A2), whereby the fusible conductor can be more surely fused.

MODIFIED EXAMPLE 2

Figure 7A:
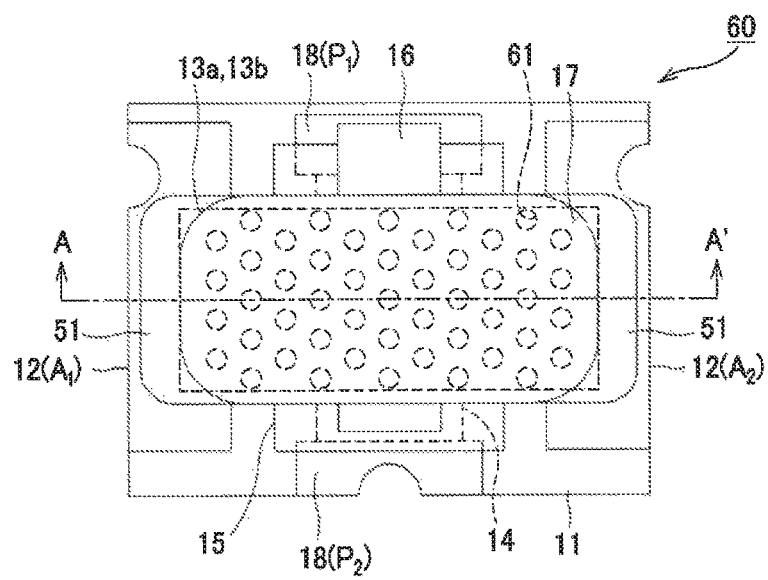
FIG. 7A is a plan view illustrating another modified example of the embodiment of a protection element according to the present invention.
Figure 7B:
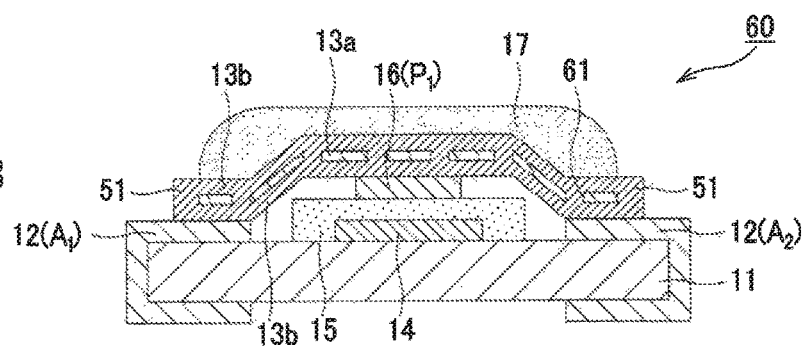
FIG. 7B is a cross-sectional view of section A-A' of FIG. 7A.

As shown in FIG. 7, a protection element 60 comprises: an insulating substrate 11; a heating body 14 laminated on the insulating substrate 11 and covered with an insulating member 15; electrodes 12(A1) and 12(A2) formed at both ends of the insulating substrate 11; a heating body extraction electrode 16 laminated on the insulating member 15 so as to be superimposed with the heating body 14; and a fusible conductor 13 each end of which is connected to the corresponding one of electrodes 12(A1) and 12(A2) and a center portion of which is connected to the heating body extraction electrode 16. Furthermore, external terminals connected to the electrodes 12(A1) and 12(A2) are formed on a back surface of the insulating substrate 11.

The fusible conductor 13 is a layered structure body comprising an internal layer and an external layer, preferably having a high melting point metal layer 13a as an internal layer and a low melting point metal layer 13b as an external layer. As the above-mentioned modified example, accumulation portions 51 and 51 may be provided at both ends of the fusible conductor 13.

In this modified example, many openings 61 are provided to the high melting point metal layer 13a, and the low melting point metal layer 13b is film-formed on said high melting point metal layer 13a having the many openings, for example, by using a plating technique. Thus, the area of the high melting point metal layer 13a which comes in contact with the low melting point metal layer 13b to be melted is increased, and accordingly the low melting point metal layer 13b can erode the high melting point metal layer 13a in a shorter time.

Therefore, the fusible conductor can be more quickly and surely fused.

MODIFIED EXAMPLE 3

Figure 8A:
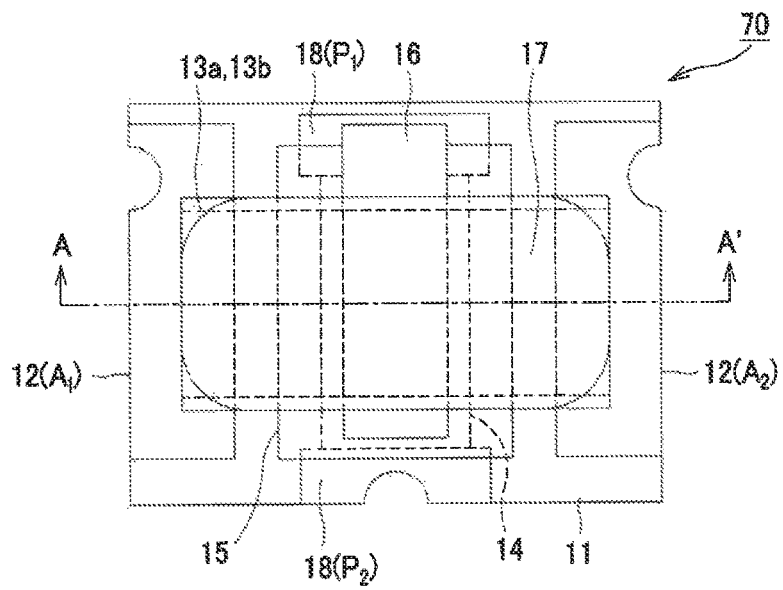
FIG. 8A is a plan view illustrating another modified example of the embodiment of a protection element according to the present invention.
Figure 8B:
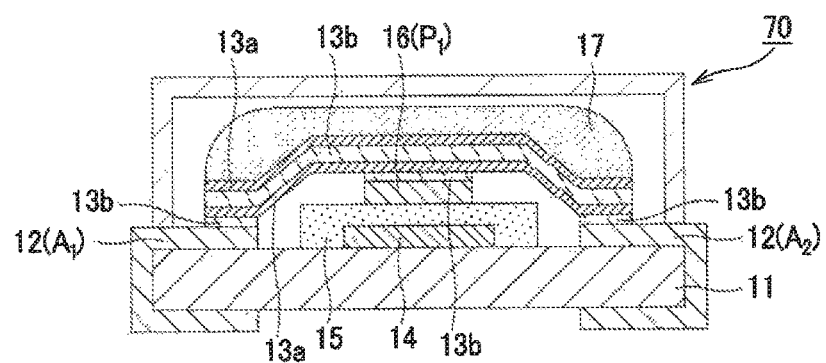
FIG. 8B is a cross-sectional view of section A-A' of FIG. 8A.

FIG. 8 illustrates another modified example wherein the configuration of the above-mentioned fusible conductor 13 was modified.

As shown in FIG. 8, a protection element 70 comprises: an insulating substrate 11; a heating body 14 laminated on the insulating substrate 11 and covered with an insulating member 15; electrodes 12(A1) and 12(A2) formed at both ends of the insulating substrate 11; a heating body extraction electrode 16 laminated on the insulating member 15 so as to be superimposed with the heating body 14; and a fusible conductor 13 each end of which is connected to the corresponding one of electrodes 12(A1) and 12(A2) and a center portion of which is connected to the heating body extraction electrode 16. Furthermore, external terminals connected to the electrodes 12(A1) and 12(A2) are formed on a back surface of the insulating substrate 11.

The fusible conductor 13 comprises a low melting point metal layer 13b as an internal layer and a high melting point metal layer 13a as an external layer. As mentioned above, Pb-free solder containing Sn as a main component may be used for the low melting point metal layer 13b, meanwhile Ag or Cu, or a metal containing any one of Ag and Cu as a main component may be used for the high melting point metal layer 13a. In the case of the modified example of FIG. 8, a flux 17 is applied on the fusible conductor 13 in order to prevent a melting temperature from rising due to oxidization of a surface of the fusible conductor 13 and also to maintain the surface tension of solder which is in a heat-generating and melting state.

As is the case with the configuration example shown in FIG. 1, a plating technique is applied to the low melting point metal layer 13b as an internal layer to form the high melting point metal layer 13a as an external layer, whereby the fusible conductor 13 in this modified example can be formed.

FIGS. 9A-9D schematically illustrate an operation of the configuration example shown in FIG. 8.

Figure 9A:
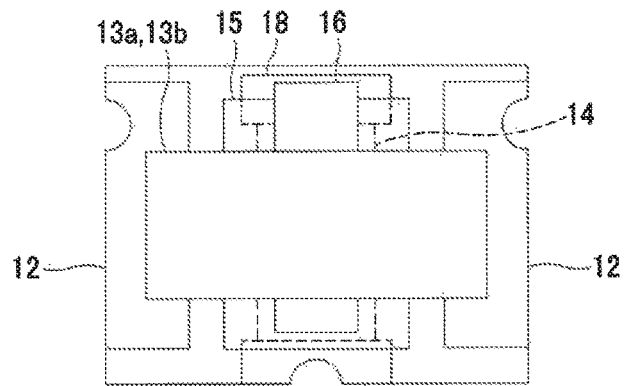
FIGS. 9A-9D are schematic plan views for describing an operation of the protection element according to the modified example of FIG. 8.

FIG. 9A illustrates a state before passing a current through the heating body 14 and at the beginning of the start of said passage of a current by connecting a power source so as to apply a voltage between the heating body electrode 18(P2) and the electrodes 12(A1), (A2).

Figure 9B:
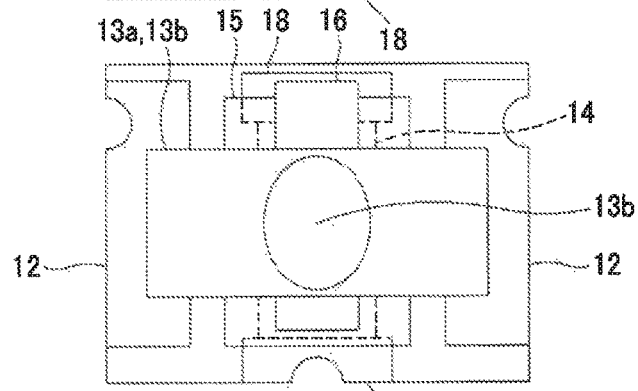

As shown in FIG. 9B, the low melting point metal layer 13b serving as an internal layer of the fusible conductor 13 right above the heating body 14 starts melting, and then the erosion phenomenon causes the low melting point metal to diffuse into the high melting point metal layer 13a as an external layer. Thus, the high melting point metal layer 13a as an external layer is eroded and disappears, meanwhile the low melting point metal layer 13b as an internal layer begins to be exposed. The interior of a circle with a solid line in the figure represents the exposed low melting point metal layer 13b, meanwhile the exterior of the circle represents the high melting point metal layers 13a as an external layer.

Figure 9C:
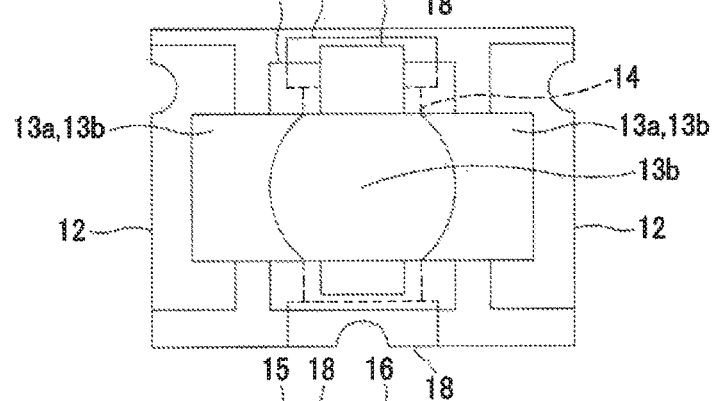
Figure 9D:
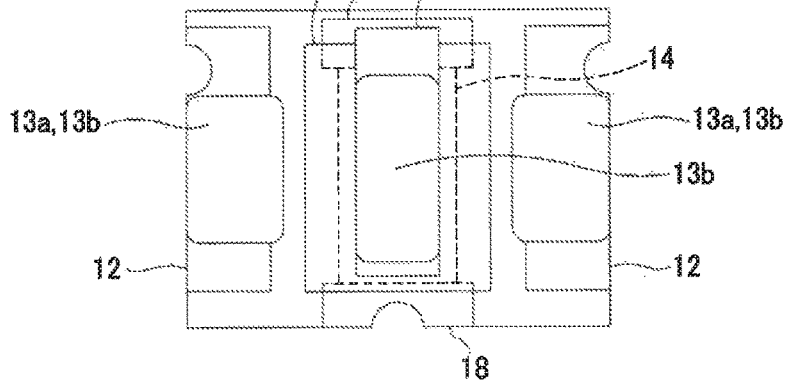

As shown in FIG. 9C, the temperature of the heating body 14 further rises, whereby melting of the low melting point metal layer 13b as an internal layer of the fusible conductor 13 proceeds, and thus an area of eroding the high melting point metal layer 13a is expanded. At this time, the whole of the low melting point metal layer 13b is in a molten state, and therefore, when the high melting point metal layer 13a is completely eroded on the heating body extraction electrode 16, the low melting point metal layer 13b, that is, solder is drawn close to each of the heating body extraction electrode 16 and the two electrodes 12 (A1) and 12 (A2) because of its wettability (surface tension), as shown in FIG. 9D. As a result, interruption between each of the electrodes is completed.

Figure 10A:
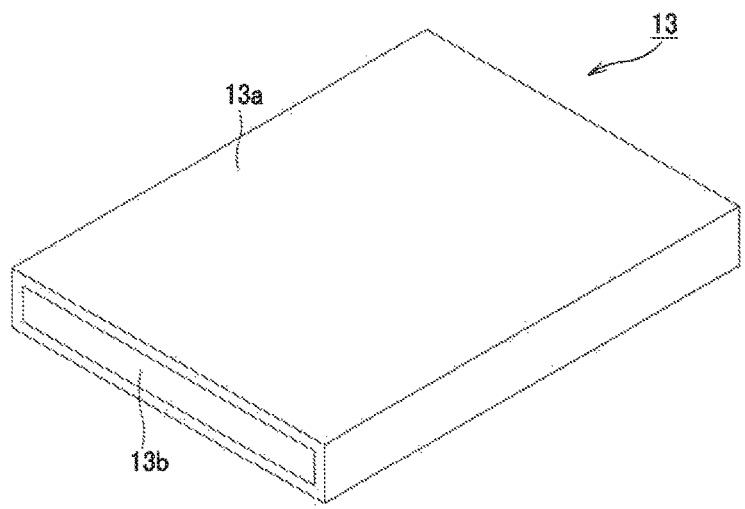
FIGS. 10A and 10B are perspective views illustrating examples of fusible conductors, each having a different shape.
Figure 10B:
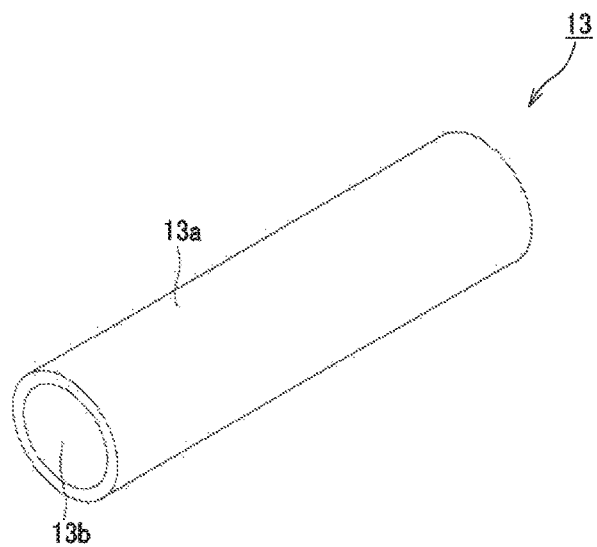

The fusible conductor 13 may be a fusible conductor having a rectangular parallelepiped shape as shown in FIG. 10A, or may be a fusible conductor having a cylindrical shape as shown in FIG. 10B. In FIGS. 10A and 10B, the low melting point metal layer 13b serves as an internal layer, meanwhile the high melting point metal layer 13a serves as an external layer, but, of course, on the contrary, the low melting point metal layer 13b may serve as an external layer, meanwhile the high melting point metal layer 13a may serve as an internal layer.

Also in the case where the low melting point metal layer 13b serves as an internal layer, meanwhile the high melting point metal layer 13a serves as an external layer, accumulation portions composed of a low melting point metal layer 13b being thicker than the low melting point metal layer 13b of the fusible conductor 13 may be provided on the electrodes 12(A1) and 12(A2), with care to maintain the thickness of the fusible conductor 13.

MODIFIED EXAMPLE 4

Figure 11A:
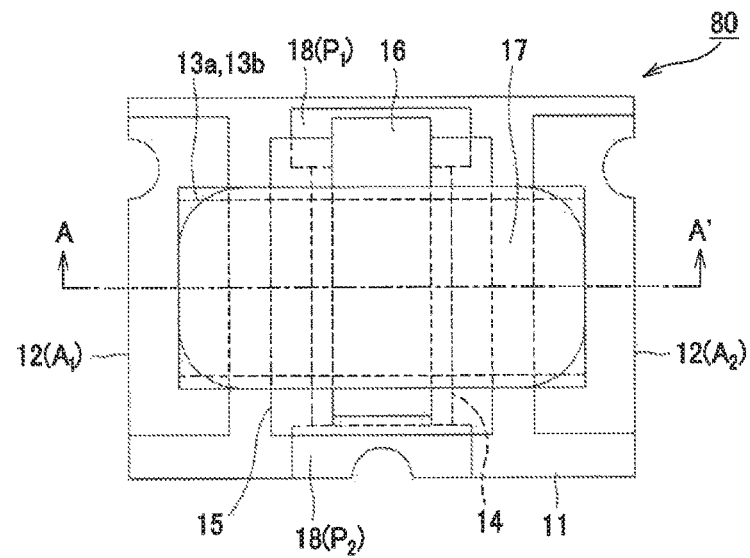
FIG. 11A is a plan view illustrating another modified example of the embodiment of a protection element according to the present invention.
Figure 11B:
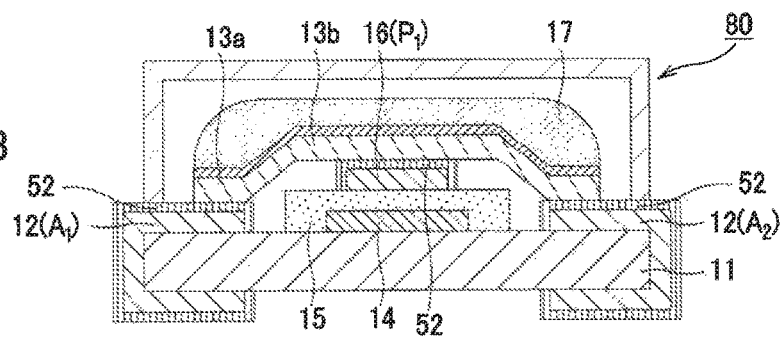
FIG. 11B is a cross-sectional view of section A-A' of FIG. 11A.

FIG. 11 illustrates another modified example wherein the configuration of the fusible conductor 13 was modified.

As shown in FIG. 11, a protection element 80 comprises: an insulating substrate 11; a heating body 14 laminated on the insulating substrate 11 and covered with an insulating member 15; electrodes 12(A1) and 12(A2) formed at both ends of the insulating substrate 11; a heating body extraction electrode 16 laminated on the insulating member 15 so as to be superimposed with the heating body 14; and a fusible conductor 13 each end of which is connected to the corresponding one of electrodes 12(A1) and 12(A2) and a center portion of which is connected to the heating body extraction electrode 16. Furthermore, external terminals connected to the electrodes 12(A1) and 12(A2) are formed on a back surface of the insulating substrate 11.

The fusible conductor 13 has a two-layer structure comprising a low melting point metal layer 13b as a lower layer and a high melting point metal layer 13a as an upper layer. As is the case mentioned above, Pb-free solder containing Sn as a main component may be used for the low melting point metal layer 13b, meanwhile Ag or Cu, or a metal containing any one of Ag and Cu as a main component may be used for the high melting point metal layer 13a.

In the case of the modified example of FIG. 11, in order to control the erosion of the electrodes themselves by the low melting point metal layer 13b and thereby to improve fusion characteristics, a plating treatment is applied to surfaces of the external terminals connected to the two electrodes 12 and 12, and a surface of the heating body extraction electrode 16, and thus a Ni/Au plating layer 52 is thus formed thereon. It should be noted that, in place of Ni/Au plating, a known plating treatment, such as Ni/Pd plating or Ni/Pd/Au plating, may be used.

MODIFIED EXAMPLE 5

Figure 12A:
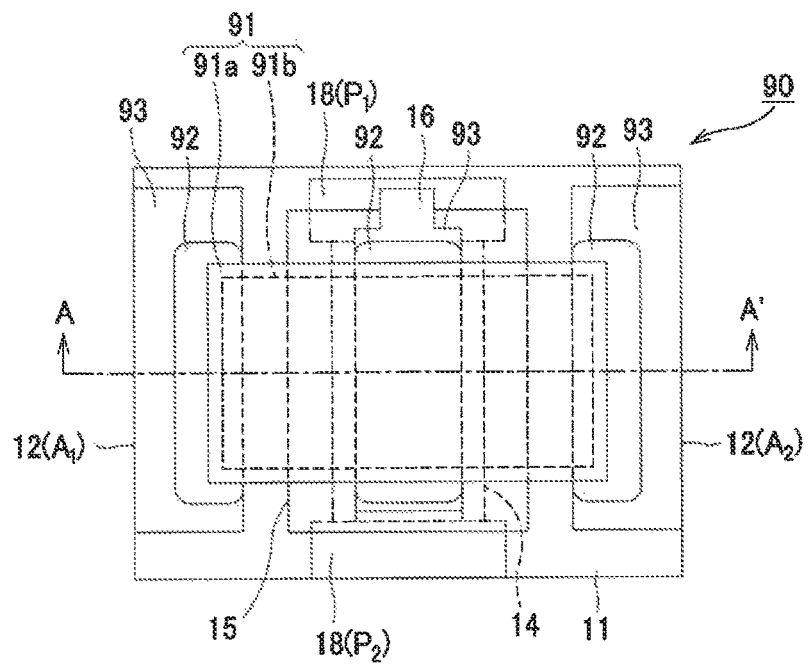
FIG. 12A is a plan view illustrating another modified example of the embodiment of a protection element according to the present invention.
Figure 12B:
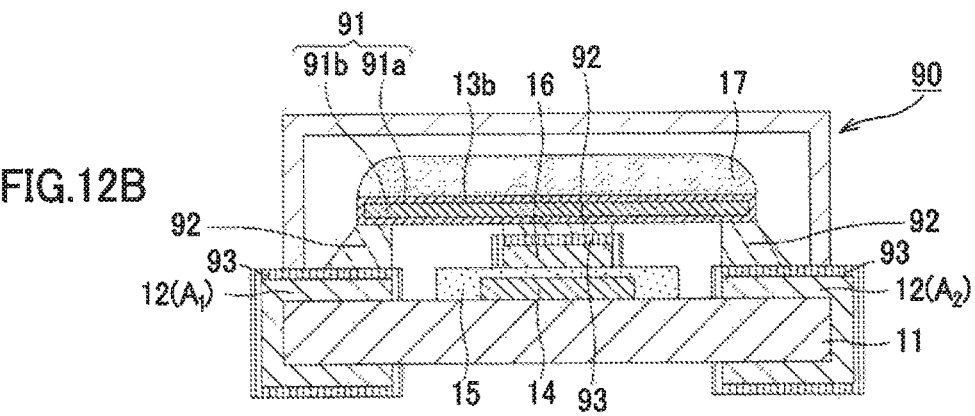
FIG. 12B is a cross-sectional view of section A-A' of FIG. 12A.

FIG. 12A and FIG. 12B illustrate another modified example wherein the configuration of the fusible conductor is further modified.

A fusible conductor 91 of a protection element 90 shown in FIG. 12 is a layered structure body comprising an internal layer and an external layer, and has a low melting point metal layer 91b as an internal layer and a high melting point metal layer 91a as an external layer. Furthermore, in the fusible conductor 91 of the protection element 90, the entire surface of the low melting point metal layer 91b is coated with the high melting point metal layer 91a.

Said fusible conductor 91 can be formed, for example, in such a manner that a sheet made of Pb-free solder containing Sn as a main component is laminated on, or a paste of Pb-free solder containing Sn as a main component is applied to a sheet made of a high melting point metal, such as Ag, and, furthermore, a high melting point metal sheet is laminated thereon and heat-pressed. Alternatively, the fusible conductor 91 can be formed by applying Ag plating to the entire surface of a sheet made of Pb-free solder.

This fusible conductor 91 is connected onto an electrode 12 and a heating body extraction electrode 16 via a low melting point metal 92, such as Pb-free solder. Furthermore, a flux 17 is applied to almost whole of the top surface of the fusible conductor 91. It should be noted that, in order to control the erosion of the electrode itself and thereby to improve fusion characteristics, a Ni/Pd/Au plating layer 93 is formed on a surface of the electrode 12 and the heating body extraction electrode 16.

In the protection element 90, even in the case where a low melting point metal layer 91b having a melting point lower than a reflow temperature is used, the use of the fusible conductor 91 in which the entire surface of the low melting point metal layer 91b as an internal layer is coated with the high melting point metal layer 91a as an external layer allows an outflow of the low melting point metal layer 91b as the internal layer toward the exterior to be controlled at the time of reflow mounting. Therefore, the protection element 90 allows the low melting point metal layer 91b to erode the high melting point metal layer 91a in a shorter time by using a heat generated by the heating body 14, whereby the fusible conductor 91 can be more quickly and surely fused.

Furthermore, the protection element 90 can control an outflow of the low melting point metal layer 91b as an internal layer at the time of reflow mounting, and thereby control deformation of the fusible conductor 91.

MODIFIED EXAMPLE 6

Figure 13A:
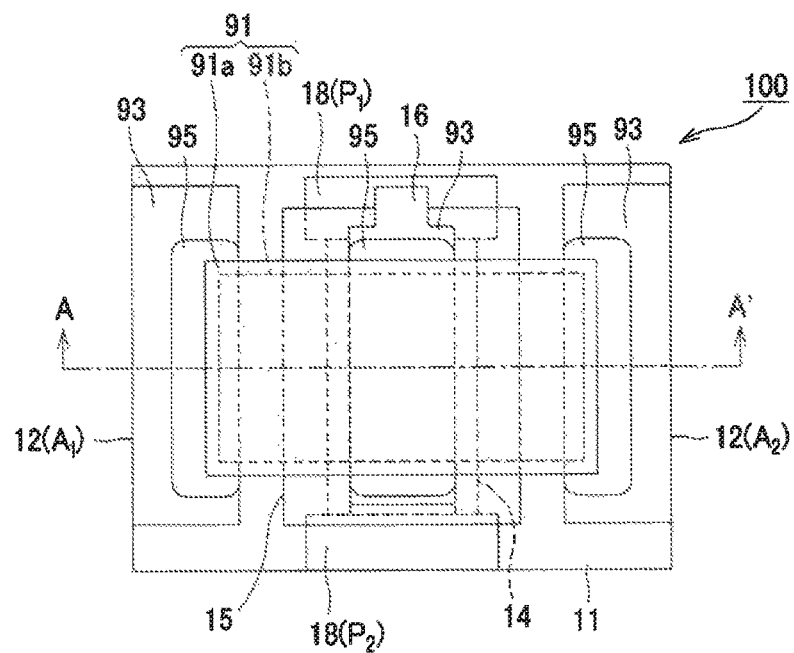
FIG. 13A is a plan view illustrating another modified example of the embodiment of a protection element according to the present invention.
Figure 13B:
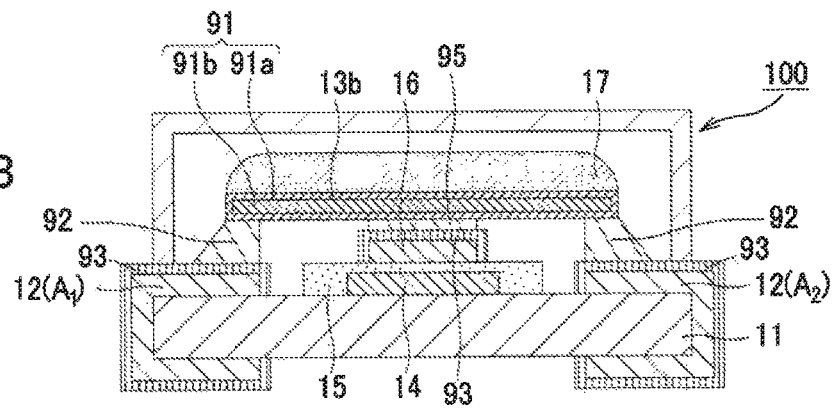
FIG. 13B is a cross-sectional view of section A-A' of FIG. 13A.

FIG. 13A and FIG. 13B illustrate another modified example wherein the configuration of connecting the fusible conductor 91 to the electrode 12 and the heating body extraction electrode 16, each being shown in FIG. 12, is modified.

In a protection element 100 shown in FIG. 13, a fusible conductor 91 is connected to the electrode 12 and the heating body extraction electrode 16 by an electrically conductive paste 95. For the electrically conductive paste 95, a metal nano-paste, such as a silver nano-paste, is preferably used. A silver nano paste forms a high melting point metal film at a baking temperature of not less than 200 degrees C., that is, approximately a reflow temperature. Furthermore, a baked film made of a silver nano-paste has conductivity and thermal conductivity which are inferior by approximately 50% to those of bulk silver.

In the protection element 100, the fusible conductor 91 is connected by using the electrically conductive paste 95 made of such metal nano-paste, and therefore, at the time of reflow mounting, the electrically conductive paste 95 is baked to form a metallic film, whereby erosion of a high melting point metal layer 91a constituting an external layer of the fusible conductor 91 can be controlled. That is, in the case where the fusible conductor 91 is connected by a low melting point metal, such as solder, the solder is melted at the time of reflow mounting, thereby eroding the high melting point metal layer 91a as an external layer, and therefore the high melting point metal layer 91a as an external layer needs to be thickly formed. However, if the high melting point metal layer 91a is thickly formed, it takes more time to fuse the fusible conductor 91.

On the other hand, in the protection element 100, the fusible conductor 91 is connected by using the electrically conductive paste 95 made of a metal nano-paste, and therefore the high melting point metal layer 91a as an external layer is not eroded, and accordingly the high melting point metal layer 91a can be thinly formed. Therefore, the protection element 100 allows the fusible conductor 91 to be surely fused in a shorter time by erosion by the low melting point metal layer 91b as an internal layer.

It should be noted that, in the protection element 100, besides the fusible conductor 91 shown in FIG. 12 in which the entire surface of the low melting point metal layer 91b as an internal layer is coated with the high melting point metal layer 91a, there may be used the fusible conductor 13 shown in FIG. 8 in which the high melting point metal layer 13a is laminated on only the top and the bottom surfaces of the low melting point metal layer 13b as an internal layer and said low melting point metal layer 13b is not completely coated therewith.

MODIFIED EXAMPLE 7

Figure 14A:
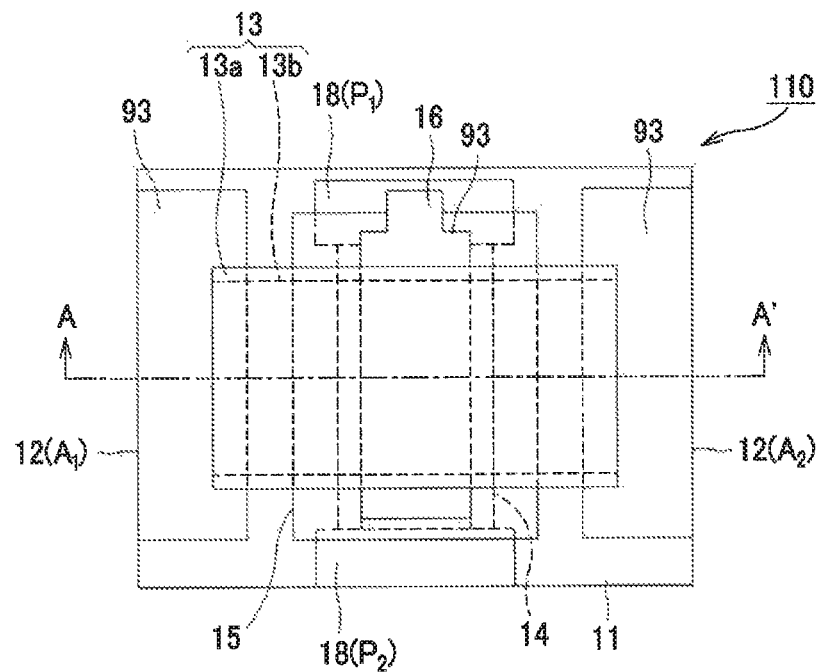
FIG. 14A is a plan view illustrating another modified example of the embodiment of a protection element according to the present invention.
Figure 14B:
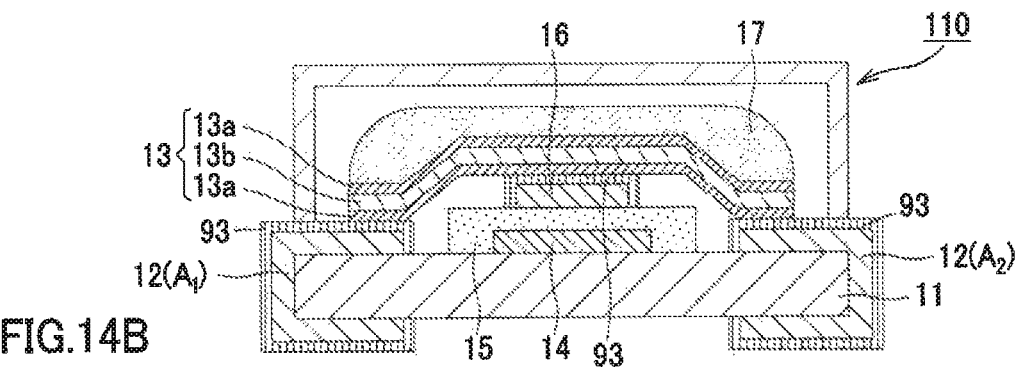
FIG. 14B is a cross-sectional view of section A-A' of FIG. 14A.

FIG. 14A and FIG. 14B illustrate another modified example wherein the configuration of connecting the fusible conductor 13 to the electrode 12 and the heating body extraction electrode 16, each being shown in FIG. 8, is modified.

In a protection element 110 shown in FIG. 14, a fusible conductor 13 is connected to an electrode 12 and a heating body extraction electrode 16 by ultrasonic welding or the like. As shown in FIG. 8, the fusible conductor 13 is such that a high melting point metal layer 13a is laminated on only the top and the bottom surfaces of a low melting point metal layer 13b as an internal layer and thus said low melting point metal layer 13b is not completely coated therewith.

In the protection element 110, an Ag plating layer is preferably formed as the high melting point metal layer 13a of the fusible conductor 13, meanwhile a Ni/Pd/Au plating layer 93 is preferably formed on the surfaces of the electrode 12 and the heating body extraction electrode 16. Adhesion by welding between Ag and Ag and between Ag and Au is excellent, and therefore, in the protection element 110, the fusible conductor 13 can be surely connected to the electrode 12 and the heating body extraction electrode 16. Furthermore, in the protection element 110, the fusible conductor 13 is connected to the electrode 12 and the heating body extraction electrode 16 by welding, and therefore the high melting point metal layer 13a of the fusible conductor 13 is not eroded due to reflow mounting, and accordingly, compared with the case where the fusible conductor 13 is connected by using a low melting point metal, such as solder, the high melting point metal layer 13a can be more thinly formed. Thus, the protection element 110 allows the fusible conductor 13 to be surely fused in a shorter time by erosion by the low melting point metal layer 13b as an internal layer.

It should be noted that, in the protection element 110, besides the fusible conductor 13 shown in FIG. 14 in which the high melting point metal layer 13a is laminated on only the top and the bottom surfaces of the low melting point metal layer 13b as an internal layer and said low melting point metal layer 13b is not completely coated therewith, there may be used the fusible conductor 91 shown in FIG. 12 in which the entire surface of the low melting point metal layer 91b as an internal layer is coated with the high melting point metal layer 91a.

MODIFIED EXAMPLE 8

Figure 15A:
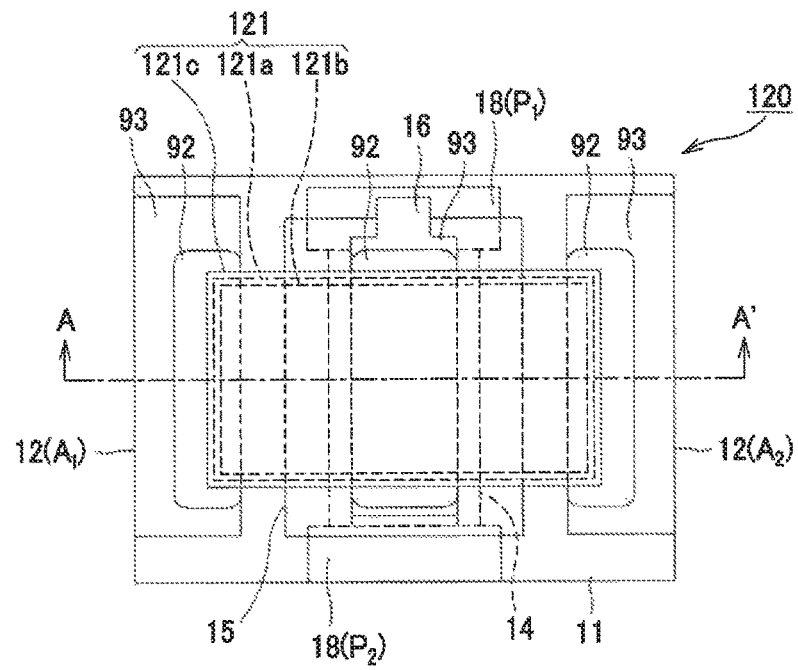
FIG. 15A is a plan view illustrating another modified example of the embodiment of a protection element according to the present invention.
Figure 15B:
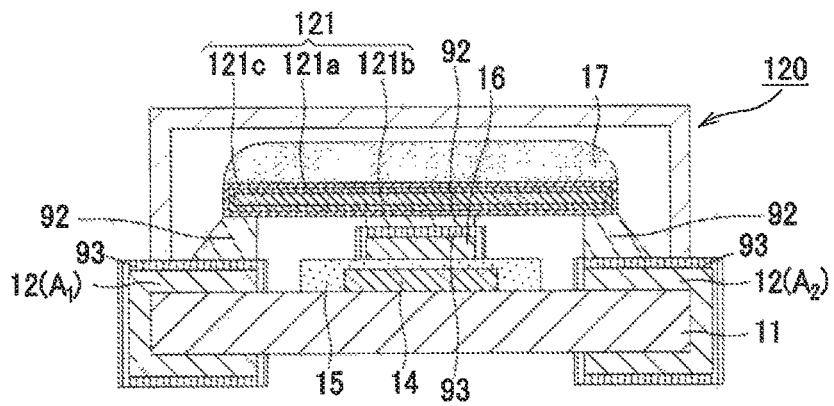
FIG. 15B is a cross-sectional view of section A-A' of FIG. 15A.

FIG. 15 illustrates another modified example wherein the configuration of the fusible conductor was further modified.

A fusible conductor 121 of a protection element 120 shown in FIG. 15 is such that the entire surface of a low melting point metal layer 121b as an internal layer is coated with a high melting point metal layer 121a, and the entire surface of said high melting point metal layer 121a is coated with a second low melting point metal layer 121c. The further coating of the high melting point metal layer 121a as an external layer with the second low melting point metal layer 121c in the fusible conductor 121 can prevent oxidization of Cu even in the case, for example, where a Cu plating layer is formed as the high melting point metal layer 121a. Therefore, the fusible conductor 121 can prevent a fusion time from being longer due to oxidization of Cu, thereby allowing fusing to be performed in a shorter time.

Furthermore, in the fusible conductor 121, a metal which is inexpensive but easily oxidized, such as Cu, can be used as the high melting point metal layer 121a, and thus the fusible conductor 121 can be formed without using an expensive material, such as Ag.

The same material as that for the low melting point metal layer 121b as an internal layer may be used for the second low melting point metal layer 121c, and, for example, Pb-free solder containing Sn as a main component may be used. Furthermore, the second low melting point metal layer 121c may be formed by applying Sn plating to the surface of the high melting point metal layer 121a.

It should be noted that, in the fusible conductor 121, the entire surface of the low melting point metal layer 121b as an internal layer may be coated with the high melting point metal layer 121a, or alternatively, the high melting point metal layer 121a may be laminated on only the top and the bottom surfaces of the low melting point metal layer 121b serving as an internal layer and thus said low melting point metal layer 121b may be not completely coated therewith. Similarly, in the fusible conductor 121, the entire surface of the high melting point metal layer 121a may be coated with the second low melting point metal layer 121c, or alternatively, the second low melting point metal layer 121c may be laminated on only the top and the bottom surfaces of the high melting point metal layer 121a and thus said high melting point metal layer 121a may be not completely coated therewith.

MODIFIED EXAMPLE 9

A fusible conductor 13 of the protection element to which the present invention is applied has a coating structure comprising a low melting point metal layer 13b as an internal layer and a high melting point metal layer 13a as an external layer, and a layer thickness ratio of the low melting point metal layer 13b to the high melting point metal layer 13a may be from 2.1:1 to 100:1. Thus, the low melting point metal layer 13b can surely have a volume larger than the high melting point metal layer 13a has, whereby fusing by erosion of the high melting point metal layer 13a can be effectively performed in a shorter time.

In other words, in the fusible conductor, the high melting point metal layer 13a is laminated on the top and bottom surfaces of the low melting point metal layer 13b constituting an internal layer, and therefore, the thicker the low melting point metal layer 13b is than a layer thickness ratio of the low melting point metal layer to the high melting point metal layer of 2.1:1, the larger volume the low melting point metal layer 13b can have than the high melting point metal layer 13a has. Furthermore, in the fusible conductor, in the case where a layer thickness ratio of the low melting point metal layer to the high melting point metal layer is more than 100:1, and thus the low melting point metal layer 13b is thicker meanwhile the high melting point metal layer 13a is thinner with respect to said layer thickness ratio, there is a risk that the high melting point metal layer 13a might be eroded by the low melting point metal layer 13b melted by a heat generated at the time of reflow mounting.

As for the range of said layer thickness ratio, a plurality of samples of fusible conductors each having a different layer thickness ratio is prepared, and arranged on an electrode 12 and a heating body extraction electrode 16 via a solder paste, then fed into a reflow furnace; and then it is observed whether an fusible conductor is fused or not. As a result, it was confirmed that, in the case where a layer thickness ratio of the low melting point metal layer to the high melting point metal layer was within a range of from 2.1:1 to 100:1, the fusible conductor was not fused even at the time of reflow mounting, and in addition to this, heating by the heating body 14 allows the high melting point metal layer 13a to be eroded by the low melting point metal layer 13b, whereby the fusible conductor was quickly fused.

It should be noted that also the fusible conductor 91 in which the entire surface of the low melting point metal layer 91b as an internal layer is coated by the high melting point metal layer 91a may have the same layer thickness ratio of the low melting point metal layer to the high melting point metal layer as that of the above-mentioned fusible conductor 13. Said layer thickness ratio allows the low melting point metal layer 13b to have a larger volume than the high melting point metal layer 13a has even in the case where the fusible conductor 91 is used, whereby fusing by erosion of the high melting point metal layer 13a can be effectively performed in a shorter time.

MODIFIED EXAMPLE 10

Figure 16:
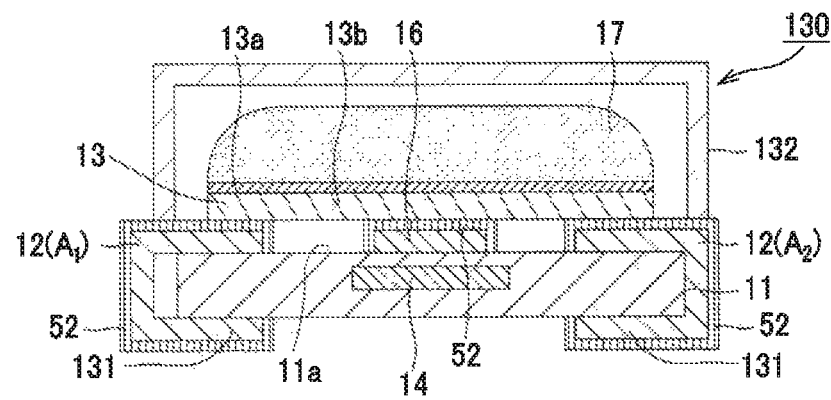
FIG. 16 is a cross-sectional view illustrating a modified example of a protection element in which a heating body is built in an insulating substrate.

FIG. 16 illustrates another modified example wherein the arrangement position of the heating body 14 is changed. As shown in FIG. 16, a protection element 130 comprises: an insulating substrate 11; a heating body 14 built in the insulating substrate 11; electrodes 12(A1) and 12(A2) formed at both ends of the insulating substrate 11; a heating body extraction electrode 16 laminated on the insulating substrate 11 so as to be superimposed with the heating body 14; and a fusible conductor 13 each end of which is connected to the corresponding one of electrodes 12(A1) and 12(A2) and a center portion of which is connected to the heating body extraction electrode 16. The protection element 130 has the same configuration as the above-mentioned protection element 80 has, except that the heating body 14 is built in the insulating substrate 11 and the insulating member 15 is not provided.

It should be noted that external terminals 131 connected to the electrodes 12(A1) and 12(A2) are formed on a back surface 11b of the insulating substrate 11. Moreover, a cover member 132 to protect a front surface of the insulating substrate 11 is provided in the protection element 130.

The fusible conductor 13 has a two layer structure comprising a high melting point metal layer 13a as an upper layer and a low melting point metal layer 13b as a lower layer, and is connected to the electrodes 12(A1) and 12(A2) and the heating body extraction electrode 16, said electrodes 12(A1) and 12(A2) and said heating body extraction electrode 16 being provided with a Ni/Au plating layer 52, via said low melting point metal layer 13b. Furthermore, in the fusible conductor 13, a flux 17 is applied on a front surface of the high melting point metal layer 13a.

In this protection element 130, the heating body 14 is built in the insulating substrate 11, whereby a front surface 11a of the insulating substrate 11 is made flat, and thus the heating body extraction electrode 16 can be formed on the same plane as the electrodes 12(A1) and 12(A2). Furthermore, in this protection element 130, the heating body extraction electrode 16 is made to have the same height as the electrodes 12(A1) and 12(A2) have, whereby the fusible conductor 13 can be made flat to be connected thereto. Therefore, in the protection element 130, fusion characteristics of the fusible conductor 13 can be improved.

Furthermore, in the protection element 130, a material excellent in thermal conductivity is used for the insulating substrate 11, whereby, as is the case where the fusible conductor 13 is heated via an insulating member 15, such as a glass layer, the fusible conductor 13 can be heated by the heating body 14.

Furthermore, in the protection element 130, an insulating member 15 is unnecessary, and an electrically conductive paste to constitute the electrodes 12(A1) and 12(A2) and the heating body extraction electrode 16 is applied to the front surface 11a of the flat insulating substrate 11, whereby the electrodes 12(A1) and 12(A2) and the heating body extraction electrode 16 can be collectively formed, and thus the reduction of labor in a manufacturing process can be achieved.

MODIFIED EXAMPLE 11

Figure 17:
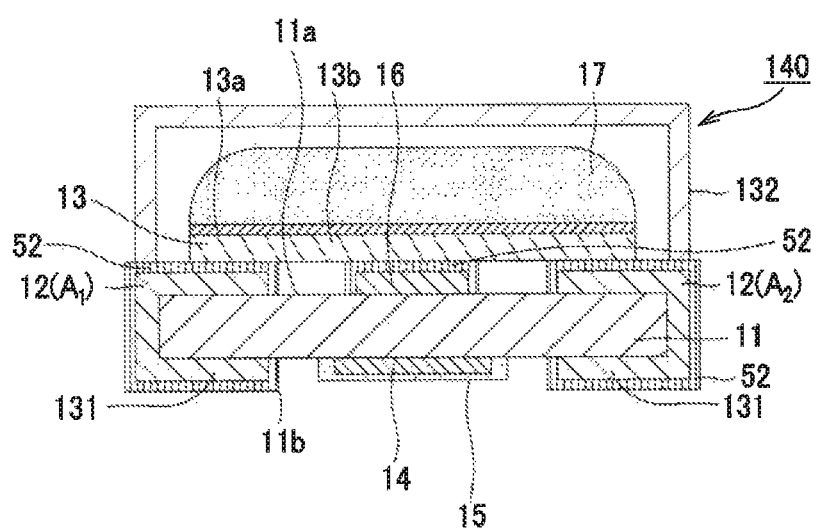
FIG. 17 is a cross-sectional view illustrating a modified example of a protection element in which a heating body is formed on a back surface of an insulating substrate.

FIG. 17 illustrates another modified example wherein the arrangement position of the heating body 14 is changed.

As shown in FIG. 17, a protection element 140 comprises: an insulating substrate 11; a heating body 14 laminated on a back surface 11b of the insulating substrate 11 and coated with an insulating member 15; electrodes 12(A1) and 12(A2) formed at both ends of the insulating substrate 11; a heating body extraction electrode 16 laminated on the insulating substrate 11 so as to be superimposed with the heating body 14; and a fusible conductor 13 each end of which is connected to the corresponding one of electrodes 12(A1) and 12(A2) and a center portion of which is connected to the heating body extraction electrode 16. The protection element 140 has the same configuration as the above-mentioned protection element 80 has, except that the heating body 14 is laminated on the back surface 11b of the insulating substrate 11.

It should be noted that external terminals 131 connected to the electrodes 12(A1) and 12(A2) are formed on a back surface 11b of the insulating substrate 11. Moreover, a cover member 132 to protect the front surface of the insulating substrate 11 is provided in the protection element 140.

In this protection element 140, the heating body 14 is laminated on the back surface 11b of the insulating substrate 11, whereby a front surface 11 a of the insulating substrate 11 is made flat, and thus the heating body extraction electrode 16 can be formed on the same plane as the electrodes 12(A1) and 12(A2). Furthermore, in this protection element 100, the heating body extraction electrode 16 has the same height as the electrodes 12 (A1) and 12 (A2) have, whereby the fusible conductor 13 can be made flat to be connected. Therefore, in the protection element 100, fusion characteristics of the fusible conductor 13 can be improved.

Furthermore, in the protection element 140, a material excellent in thermal conductivity is used for the insulating substrate 11, whereby the fusible conductor 13 can be heated by the heating body 14, as is the case where a heating body 14 is laminated on the front surface 11a of the insulating substrate 11.

Furthermore, in the protection element 140, an electrically conductive paste to constitute the electrodes 12(A1) and 12(A2) and the heating body extraction electrode 16 is applied to the front surface 11a of the flat insulating substrate 11, whereby the electrodes 12(A1) and 12(A2) and the heating body extraction electrode 16 can be collectively formed, and thus the reduction of labor in a manufacturing process can be achieved.

MODIFIED EXAMPLE 12

Figure 18:
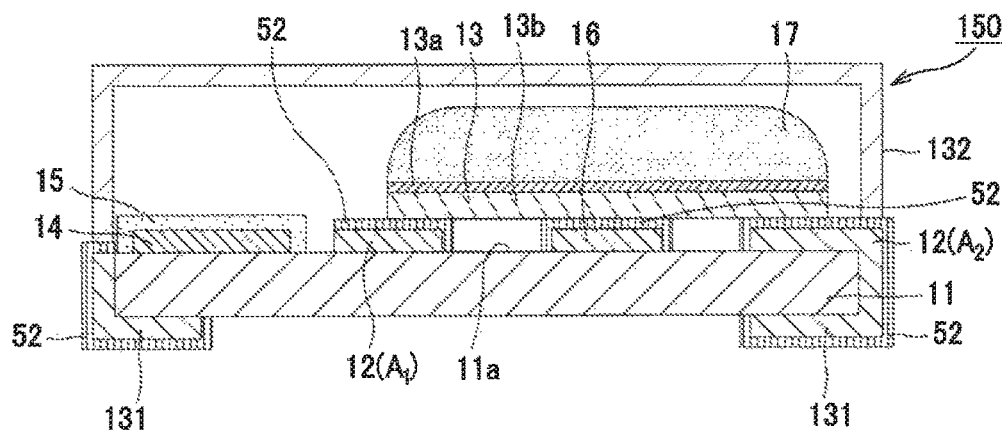
FIG. 18 is a cross-sectional view illustrating a modified example of a protection element in which a heating body is formed on a front surface of an insulating substrate.

FIG. 18 illustrates another modified example wherein the arrangement position of the heating body 14 is changed.

As shown in FIG. 18, a protection element 150 comprises: an insulating substrate 11; a heating body 14 laminated on a front surface 11a of the insulating substrate 11 and coated with an insulating member 15; electrodes 12(A1) and 12(A2) formed on the front surface 11a of the insulating substrate 11 so as to be adjacent to the heating body 14; a heating body extraction electrode 16 laminated between the electrodes 12(A1) and 12(A2) on the front surface 11a of the insulating substrate 11 and electrically connected to the heating body 14; and a fusible conductor 13 each end of which is connected to the corresponding one of electrodes 12(A1) and 12(A2) and a center portion of which is connected to the heating body extraction electrode 16. The protection element 150 has the same configuration as the above-mentioned protection element 80 has, except that the heating body 14 is laminated on the front surface 11 a of the insulating substrate 11.

It should be noted that external terminals 131 connected to the electrodes 12(A1) and 12(A2) are formed on a back surface 11b of the insulating substrate 11. Moreover, a cover member 132 to protect the front surface of the insulating substrate 11 is provided in the protection element 150.

In this protection element 150, the heating body 14 is laminated on the front surface 11a of the insulating substrate 11 so as to be adjacent to the electrode 12(A1), whereby the front surface 11a of the insulating substrate 11 is made flat, and thus the heating body extraction electrode 16 can be formed on the same plane as the electrodes 12(A1) and 12(A2). Furthermore, in the protection element 150, the heating body extraction electrode 16 has the same height as the electrodes 12(A1) and 12(A2) have, whereby the fusible conductor 13 can be made flat to be connected thereto. Therefore, in the protection element 150, fusion characteristics of the fusible conductor 13 can be improved.

Furthermore, in the protection element 150, the heating body 14 is laminated so as to be adjacent to the electrode 12(A1), whereby a generated heat can be efficiently transferred to the fusible conductor 13, and thus the fusible conductor 13 can be heated as is the case where the heating body 14 is superimposed with the heating body extraction electrode 16 via the insulating member 15.

Furthermore, in the protection element 150, an electrically conductive paste to constitute the electrodes 12(A1) and 12(A2), the heating body 14, and the heating body extraction electrode 16 is applied to the front surface 11a of the flat insulating substrate 11, whereby the electrodes 12(A1) and 12(A2), the heating body 14, and the heating body extraction electrode 16 can be collectively formed, and thus the reduction of labor in a manufacturing process can be achieved. Furthermore, in the protection element 110, the heating body 14 is formed on the front surface 11a of the insulating substrate 11 and not superimposed with the heating body extraction electrode 16, and therefore the protection element 110 can be miniaturized by the height reduction in a thickness direction of the insulating substrate 11.

MODIFIED EXAMPLE 13

Figure 19:
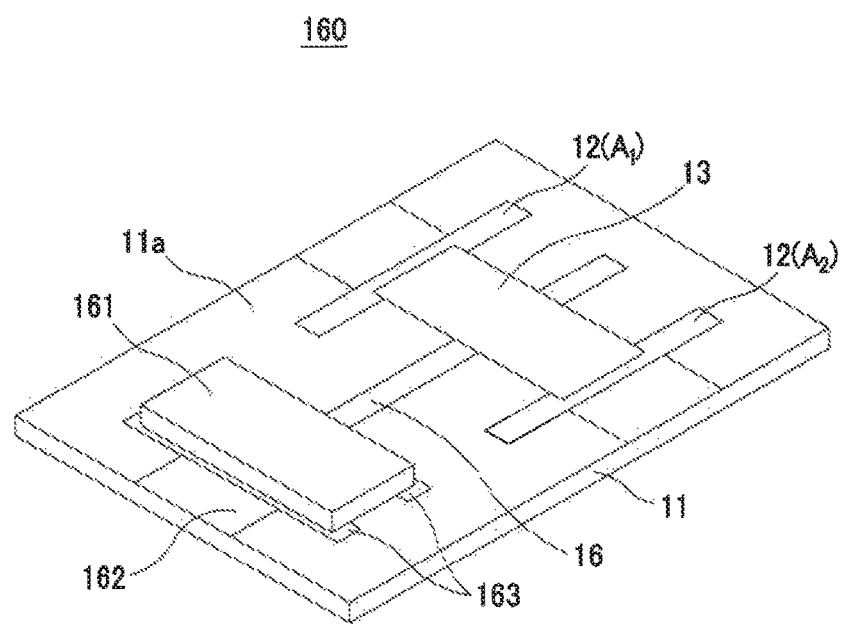
FIG. 19 is a perspective view illustrating a modified example of a protection element in which a heating element is mounted on a front surface of an insulating substrate.

FIG. 19 illustrates another modified example wherein, in place of applying the configuration in which a heating element 14 is formed by applying and baking an electrically conductive paste, a heating element is used and made adjacent to electrodes 12(A1) and 12(A2).

As shown in FIG. 19, a protection element 160 comprises: an insulating substrate 11; a heating element 161 mounted on a front surface 11a of the insulating substrate 11; electrodes 12(A1) and 12(A2) formed on the front surface 11a of the insulating substrate 11 so as to be adjacent to the heating element 161; a heating body extraction electrode 16 laminated between the electrodes 12(A1) and 12(A2) on the front surface 11a of the insulating substrate 11 and electrically connected to the heating element 161; and a fusible conductor 13 each end of which is connected to the corresponding one of electrodes 12(A1) and 12(A2) and a center portion of which is connected to the heating body extraction electrode 16. The protection element 160 has the same configuration as the above-mentioned protection element 80 has, except that, in place of the heating body 14, a heating element 161 is connected to the heating body extraction electrode 16 laminated on the front surface 11a of the insulating substrate 11 and is also connected to a heating element electrode 162. The heating element 161 is mounted on a land portion 163 formed on the front surface 11a of the insulating substrate 11.

In the protection element 160, the heating element electrode 162 is connected to the above-mentioned current control element 27, whereby, when an abnormal voltage is detected in any one of the battery cells 21 to 24, the heating element 161 is operated to interrupt a charge-and-discharge path of the battery stack 25.

Also in the protection element 160, the heating element 161 is laminated on the front surface 11a of the insulating substrate 11 so as to be adjacent to the electrode 12(A1), whereby the front surface 11a of the insulating substrate 11 is made flat, and thus the heating body extraction electrode 16 can be formed on the same plane as the electrodes 12(A1) and 12(A2). Furthermore, in the protection element 160, the heating body extraction electrode 16 is made to have the same height as the electrodes 12 (A1) and 12 (A2) have, whereby the fusible conductor 13 can be made flat to be connected thereto. Therefore, in the protection element 160, fusion characteristics of the fusible conductor 13 can be improved.

Furthermore, in the protection element 160, the heating element 161 is laminated so as to be adjacent to the electrodes 12(A1) and 12(A2), whereby a generated heat can be efficiently transferred to the fusible conductor 13, and thus the fusible conductor 13 can be heated as is the case where the heating body 14 is superimposed with the heating body extraction electrode 16 via the insulating member 15.

Furthermore, in the protection element 160, an electrically conductive paste to constitute the electrodes 12(A1) and 12(A2) and the heating body extraction electrode 16 is applied to the front surface 11a of the flat insulating substrate 11, whereby the electrodes 12(A1) and 12(A2) and the heating body extraction electrode 16 can be collectively formed, and thus the reduction of labor in a manufacturing process can be achieved. Furthermore, the protection element 160 does not have such a configuration that the heating body 14 is formed on the front surface 11a of the insulating substrate 11 so as to be superimposed with the heating body extraction electrode 16, and therefore the protection element 160 can be miniaturized by the height reduction in a thickness direction of the insulating substrate 11.

Furthermore, in the protection element 160, as the heating element 161, there may be used an element selected from various kinds of elements to be mounted, and capable of generating a heat having a high temperature suitable for fusing of the fusible conductor 13.

MODIFIED EXAMPLE 14

FIG. 20A to FIG. 22B illustrate modified examples wherein the configuration of the fusible conductor is modified.

A protection element 170 shown in FIG. 20A and FIG. 20B uses a fusible conductor 173 having a three-layer structure wherein high melting point metal layers 172 as external layers are formed on both surfaces of a low melting point metal layer 171 as an internal layer. In the fusible conductor 173, a linear opening portion 172a is formed in the high melting point metal layer 172 constituting an external layer, along a longitudinal direction thereof, and the low melting point metal layer 171 is exposed from said opening portion 172a. In the fusible conductor 173, the exposure of the low melting point metal layer 171 from the opening portion 172a allows a contact area of a molten low melting point metal with the high melting point metal layer 172 to be increased, whereby an erosion action of the high melting point metal layer 172 can be further promoted, thereby improving fusion characteristics. The opening portion 172a in the high melting point metal layer 172 can be formed, for example, in such a manner that plating of a metal constituting the high melting point metal layer 172 is partially applied to the low melting point metal layer 171.

The protection element 170 has the same configuration as the above-mentioned protection element 10 has, except that a fusible conductor 173 is used in place of the fusible conductor 13. The fusible conductor 173 is connected to the electrodes 12(A1) and 12(A2) and the heating body extraction electrode 16, each being provided with a Ni/Au plating layer 52, via a low melting point metal 134, such as solder. Furthermore, in the fusible conductor 173, a flux 17 is applied on a surface of the high melting point metal layer 172. The high melting point metal layer 172 may be formed by using the same material as that used for the above-mentioned high melting point metal layer 13a, meanwhile the low melting point metal layer 171 may be formed by using the same material as that used for the above-mentioned low melting point metal layer 13b.

Furthermore, in the fusible conductor 173, solder may be used as a metal to constitute the low melting point metal layer 171, meanwhile a surface of the high melting point metal layer 172 may be coated with Au or a film containing Au as a main component. Thus, in the fusible conductor 173, wettability of the solder constituting the low melting point metal layer 171 can be further improved, whereby the erosion action can be promoted.

Figure 21A:
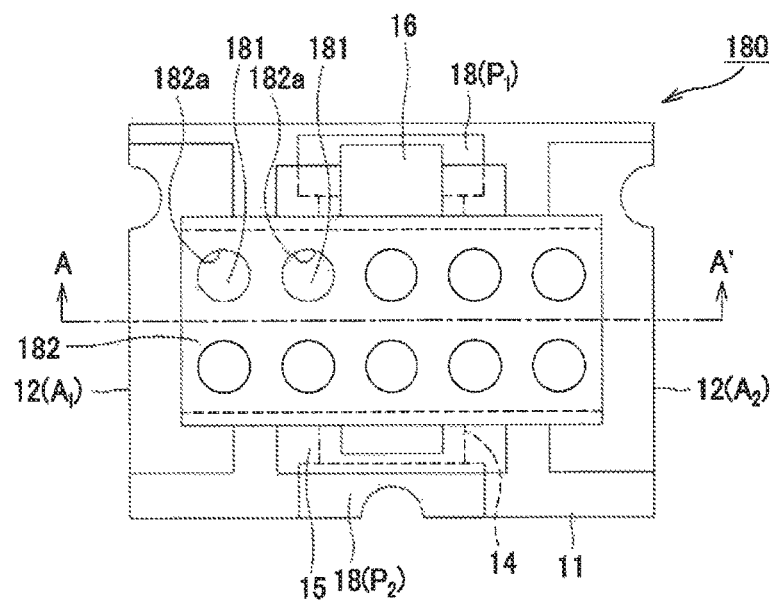
FIGS. 21A and 21B illustrate a modified example of a protection element using a fusible conductor in which a circular opening portion is provided to a high melting point metal layer so that a low melting point metal layer is exposed therefrom.
Figure 21B:
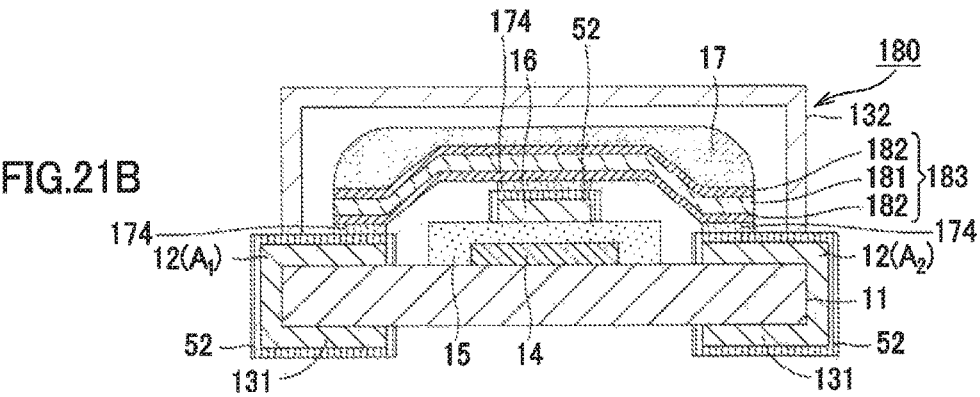

A protection element 180 shown in FIG. 21A and FIG. 21B uses a fusible conductor 183 having a three-layer structure wherein high melting point metal layers 182 as external layers are formed on both surfaces of a low melting point metal layer 181 as an internal layer. In the fusible conductor 183, a circular opening portion 182a is formed over the entire surface of the high melting point metal layer 182 constituting an external layer, and the low melting point metal layer 181 is exposed from said opening portion 182a.

Other configurations of the protection element 180 are the same as those of the above-mentioned protection element 170. The opening portion 182a of the high melting point metal layer 182 can be formed, for example, in such a manner that plating of a metal constituting the high melting point metal layer 182 is partially applied to the low melting point metal layer 181.

In the fusible conductor 183, the exposure of the low melting point metal layer 181 from the opening portion 182a allows a contact area of a molten low melting point metal with the high melting point metal layer 182 to be increased, whereby an erosion action of the high melting point metal layer 182 can be further promoted, thereby improving fusion characteristics.

Furthermore, in the fusible conductor 183, solder may be used as a metal to constitute the low melting point metal layer 181, meanwhile a surface of the high melting point metal layer 182 may be coated with Au or a film containing Au as a main component. Thus, in the fusible conductor 183, wettability of the solder constituting the low melting point metal layer 181 can be further improved, whereby the erosion action can be promoted.

Figure 22A:
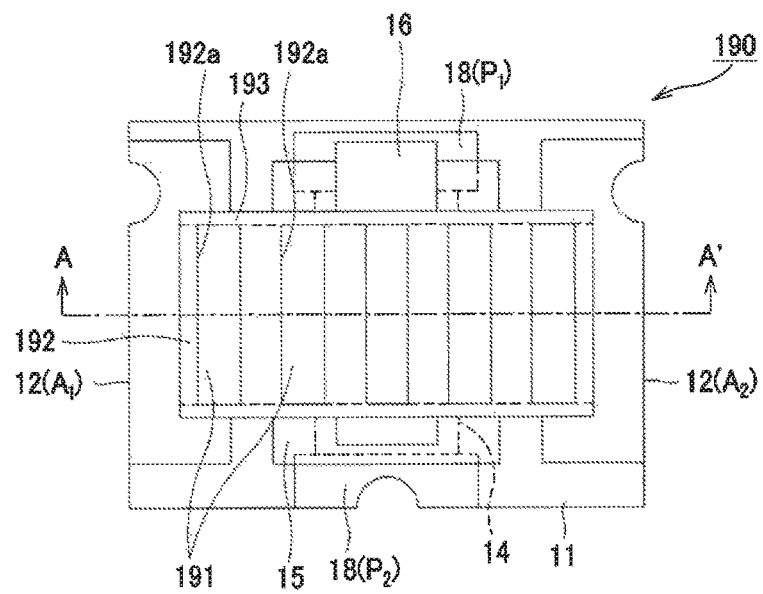
FIGS. 22A and 22B illustrate a modified example of a protection element using a fusible conductor in which a linear opening portion is provided to a high melting point metal layer so that a low melting point metal layer is exposed therefrom.
Figure 22B:
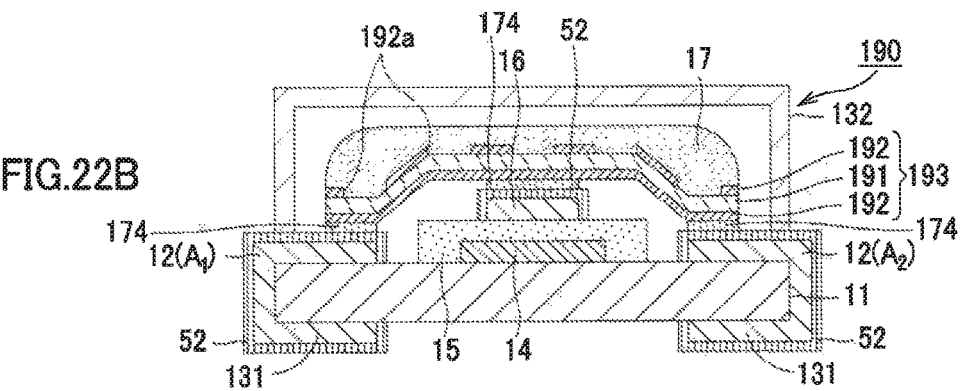

A protection element 190 shown in FIG. 22A and FIG. 22B uses a fusible conductor 193 having a three-layer structure wherein high melting point metal layers 192 as external layers are formed on both surfaces of a low melting point metal layer 191 as an internal layer. In the fusible conductor 193, a plurality of linear opening portions 192a each extending in a width direction is formed in the high melting point metal layer 192 constituting an external layer, so as to line up in a longitudinal direction, and the low melting point metal layer 191 is exposed from said opening portions 192a.

Other configurations of the protection element 190 are the same as those of the above-mentioned protection element 170. The opening portions 192a of the high melting point metal layer 192 can be formed, for example, in such a manner that plating of a metal constituting the high melting point metal layer 192 is partially applied to the low melting point metal layer 191.

In the fusible conductor 193, the exposure of the low melting point metal layer 191 from the opening portions 192a allows a contact area of a molten low melting point metal with the high melting point metal layer 192 to be increased, whereby an erosion action of the high melting point metal layer can be further promoted, thereby improving fusion characteristics.

Furthermore, in the fusible conductor 193, solder may be used as a metal to constitute the low melting point metal layer 191, meanwhile a surface of the high melting point metal layer 192 may be coated with Au or a film containing Au as a main component. Thus, in the fusible conductor 193, wettability of the solder constituting the low melting point metal layer 191 can be further improved, whereby the erosion action can be promoted.

MODIFIED EXAMPLE 15

Figure 23A:
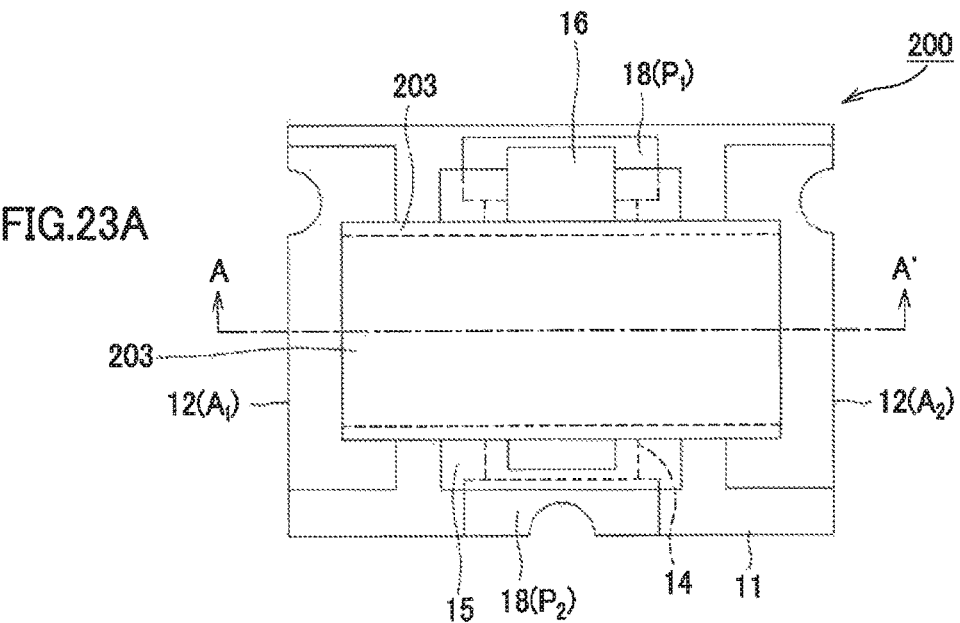
FIGS. 23A and 23B illustrate a modified example of a protection element in which a fusible conductor having a two-layer structure comprising a high melting point metal layer and a low melting point metal layer is connected by a low melting point metal.
Figure 23B:
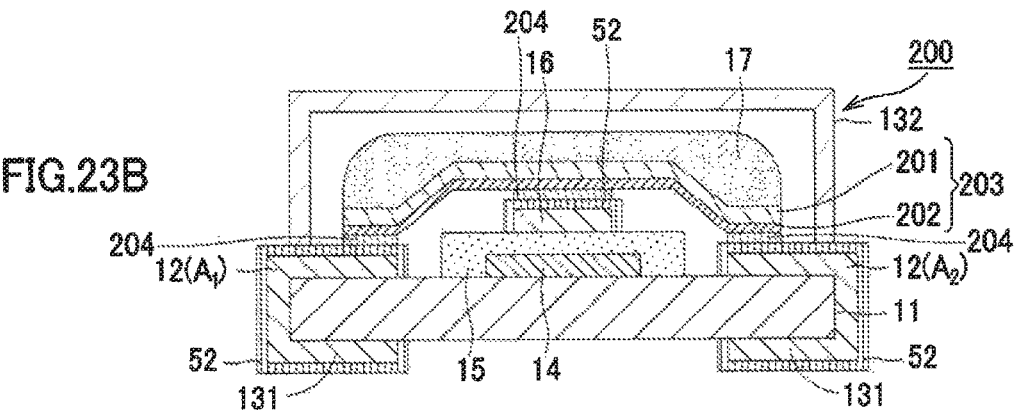

FIGS. 23A and 23B illustrate another modified example wherein the configuration of the fusible conductor is modified.

A protection element 200 shown in FIG. 23A and FIG. 23B uses a fusible conductor 203 in which a low melting point metal layer 201 is arranged as an upper layer, meanwhile a high melting point metal layer 202 is formed as a lower layer. The fusible conductor 203 is connected to electrodes 12(A1) and 12(A2) and a heating body extraction electrode 16, each being provided with a Ni/Au plating layer 52, via a low melting point metal 204, such as solder. Thus, the fusible conductor 203 has a three-layer structure comprising the low melting point metal 204, the high melting point metal layer 202, and the low melting point metal layer 201, which are arranged on the electrodes 12(A1) and 12(A2) and the heating body extraction electrode 16.

In the fusible conductor 203, a flux 17 is applied on a surface of the low melting point metal layer 201. The protection element 200 has the same configuration as the above-mentioned protection element 10 has, except that the fusible conductor 203 is used in place of the fusible conductor 13. The high melting point metal layer 202 may be formed by using the same material as that used for the above-mentioned high melting point metal layer 13a, meanwhile the low melting point metal layer 201 may be formed by using the same material as that used for the above-mentioned low melting point metal layer 13b.

In the protection element 200, the fusible conductor 203 has a three-layer structure comprising the low melting point metal 204, the high melting point metal layer 202, and the low melting point metal layer 201, which are arranged on the electrodes 12(A1) and 12(A2) and the heating body extraction electrode 16, and therefore an action of eroding the high melting point metal layer 202 by the molten low melting point metal 204 and the molten low melting point metal layer 201 allows aggregation of the molten conductor on the electrodes 12 (A1) and 12 (A2) and the heating body extraction electrode 16 to be further promoted, thereby improving fusion characteristics.

Furthermore, in the protection element 200, the fusible conductor 203 can be formed through a simple process of laminating the high melting point metal layer 202 on a surface of the low melting point metal layer 201.

Furthermore, in the fusible conductor 203, solder may be used as a metal to constitute the low melting point metal layer 201, meanwhile a surface of the high melting point metal layer 202 may be coated with Au or a film containing Au as a main component. Thus, in the fusible conductor 203, the wettability of the solder constituting the low melting point metal layer 201 can be further improved, whereby the erosion action can be promoted.

MODIFIED EXAMPLE 16

FIGS. 24A and 24B illustrate another modified example wherein the configuration of the fusible conductor is modified.

A protection element 210 shown in FIG. 24A and FIG. 24B uses a fusible conductor 215 having a four-layer structure wherein a first high melting point metal layer 211, a first low melting point metal layer 212, a second high melting point metal layer 213, and a second low melting point metal layer 214 are laminated in the order from top to bottom. The fusible conductor 215 is connected to electrodes 12(A1) and 12(A2) and a heating body extraction electrode 16, each being provided with a Ni/Au plating layer 52, via the second low melting point metal layer 214.

In the fusible conductor 215, a flux 17 is applied on a surface of the first low melting point metal layer 211. The protection element 210 has the same configuration as the above-mentioned protection element 10 has, except that the fusible conductor 215 is used in place of the fusible conductor 13. The first high melting point metal layer 211 and the second high melting point metal layer 213 may be formed by using the same material as that used for the above-mentioned high melting point metal layer 13a, meanwhile the first low melting point metal layer 212 and the second low melting point metal layer 214 may be formed by using the same material as that used for the above-mentioned low melting point metal layer 13b.

In the protection element 210, an action of eroding the first and second high melting point metal layers 211 and 213 by the molten first and second low melting point metal layers 212 and 214 allows aggregation of the molten conductors on the electrodes 12(A1) and 12(A2) and the heating body extraction electrode 16 to be further promoted, thereby improving fusing characteristics between the electrodes 12(A1) and 12(A2) and the heating body extraction electrode 16.

Furthermore, when the second low melting point metal layer 214 is made to serve as a lowest layer, said second low melting point metal layer 214 is made to serve also as an adhesive layer to make a connection to the electrodes 12 (A1) and 12 (A2) and the heating body extraction electrode 16. It should be noted that the protection element 210 may use a fusible conductor having a four or more layer structure, the structure being such that a high melting point metal layer and a low melting point metal layer are alternately laminated.

MODIFIED EXAMPLE 17

Figure 25A:
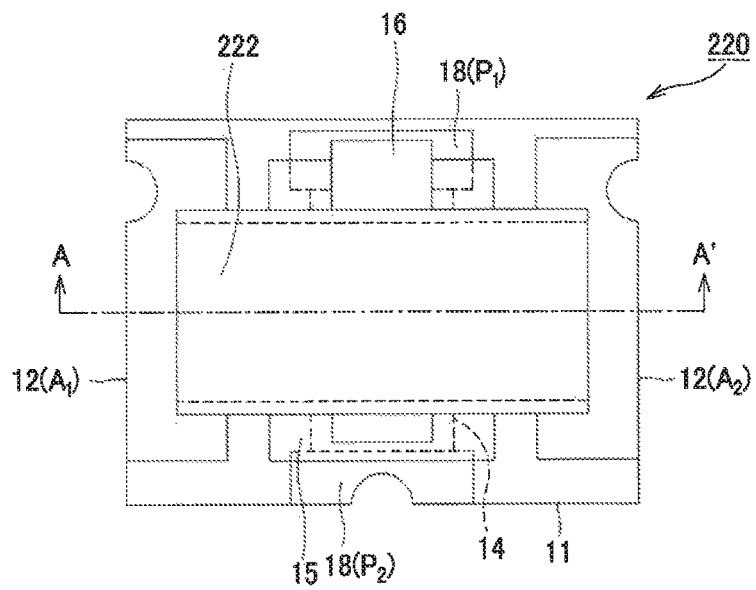
FIGS. 25A and 25B illustrate a modified example of a protection element in which a fusible conductor composed of a monolayer of a high melting point metal layer is connected by a low melting point metal.
Figure 25B:
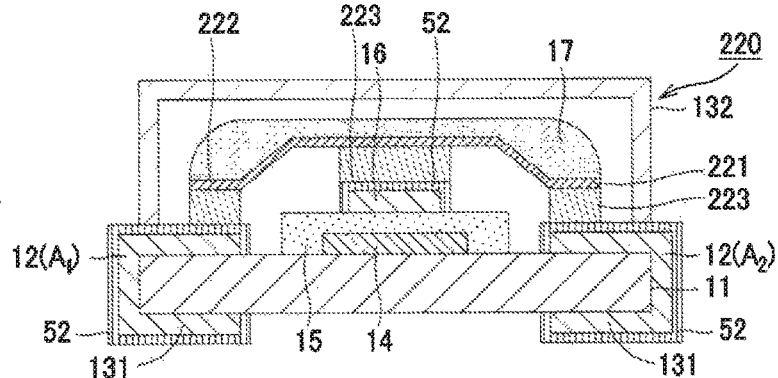

FIGS. 25A and 25B illustrate another modified example wherein the configuration of the fusible conductor is modified.

A protection element 220 shown in FIG. 25A and FIG. 25B uses a fusible conductor 222 having a single layer comprising only a high melting point metal layer 221. The fusible conductor 222 is connected to electrodes 12(A1) and 12(A2) and a heating body extraction electrode 16, each being provided with a Ni/Au plating layer 52, via a low melting point metal 223 such as solder. Thus, in the fusible conductor 222, there is formed a two-layer structure comprising the low melting point metal 223 and the high melting point metal layer 221 which are arranged on the electrodes 12 (A1) and 12 (A2) and the heating body extraction electrode 16.

In the fusible conductor 222, a flux 17 is applied on a surface of the high melting point metal layer 221. The protection element 220 has the same configuration as the above-mentioned protection element 10 has, except that the fusible conductor 222 is used in place of the fusible conductor 13. The high melting point metal layer 221 may be formed by using the same material as that used for the above-mentioned high melting point metal layer 13a, meanwhile the low melting point metal 223 may be formed by using the same material as that used for the above-mentioned low melting point metal layer 13b.

In the protection element 220, the fusible conductor 222 forms a two-layer structure comprising the low melting point metal 223 and the high melting point metal layer 221 which are arranged on the electrodes 12 (A1) and 12 (A2) and the heating body extraction electrode 16, and therefore an action of eroding the high melting point metal layer 221 by the molten low melting point metal 223 allows aggregation of the molten conductor on the electrodes 12 (A1) and 12 (A2) and the heating body extraction electrode 16 to be further promoted, thereby improving fusion characteristics. Hence, the low melting point metal 223 is preferably formed so as to be thicker than the high melting point metal layer 221 in the fusible conductor 222.

Furthermore, in the protection element 220, the fusible conductor 222 has a single layer structure comprising only the high melting point metal layer 221, and therefore can be formed through a simple process.

It should be noted that, also in the fusible conductor 222, solder may be used as a metal to constitute the low melting point metal 223, meanwhile a surface of the high melting point metal layer 221 may be coated with Au or a film containing Au as a main component. Thus, in the fusible conductor 222, wettability of the solder constituting the low melting point metal 223 can be further improved, whereby the erosion action can be promoted.

MODIFIED EXAMPLE 18

Figure 26:
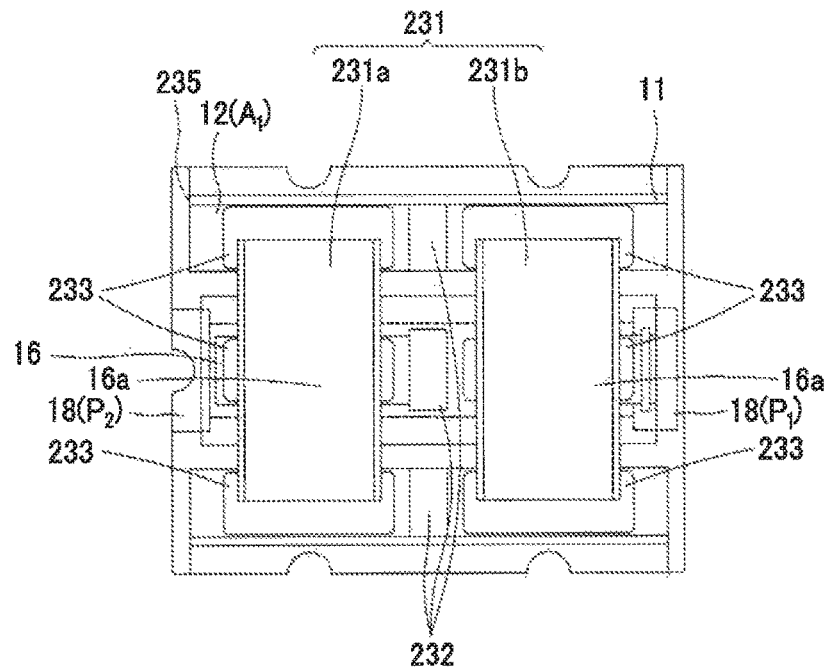
FIG. 26 is a plan view illustrating a protection element in which a plurality of fusible conductors is provided and also an insulating layer is formed on a heating body extraction electrode.

FIG. 26 illustrates another modified example wherein a plurality of fusible conductors is used.

A protection element 230 shown in FIG. 26 is obtained by upsizing a fusible conductor 231 so as to increase the rating of the protection element 230 for the use of high currents. Here it should be noted that upsizing of the fusible conductor 231 causes an increase in the volume of a molten conductor at the time of melting, whereby there is a risk that the molten conductor aggregates between each of the electrodes 12(A1) and 12(A2) and the heating body extraction electrode 16, and thereby the molten conductor cannot be fused.

Therefore, in the protection element 230, a plurality of divided fusible conductors is used, and also an insulating layer 232 is formed around a fusible conductor connecting portion 16a arranged on the heating body extraction electrode 16. For example, as shown in FIG. 26, in the protection element 230, a first fusible conductor 231a and a second fusible conductor 231b are provided thereby to improve the rating as a whole. The first fusible conductor 231a and the second fusible conductor 231b each are connected to from the electrode 12 (A1) via the heating body extraction electrode 16 to the electrode 12 (A2) by a low melting point metal 233, such as solder. Furthermore, the first fusible conductor 231a and the second fusible conductor 231b are arranged so as to be spaced at a predetermined distance from each other.

The first fusible conductor 231a and the second fusible conductor 231b each have a layered structure in which a low melting point metal layer constituting an internal layer is covered with a high melting point metal layer constituting an external layer, and, as shown in FIGS. 22A and 22B, said conductors each are connected to the electrodes 12(A1) and 12(A2) and the heating body extraction electrode 16 via the low melting point metal 233. Alternatively, the first fusible conductor 231a and the second fusible conductor 231b each may have a layered structure in which a low melting point metal layer and a high melting point metal layer are laminated, and said conductors each may be connected to the electrodes 12(A1) and 12(A2) and the heating body extraction electrode 16 via the low melting point metal layer constituting a lower layer. Alternatively, the first fusible conductor 231a and the second fusible conductor 231b each may have a single-layer structure comprising only a high melting point metal layer, and said conductors each may be connected to the electrodes 12(A1) and 12(A2) and the heating body extraction electrode 16 by the low melting point metal 233. Alternatively, the first fusible conductor 231a and the second fusible conductor 231b each may have a configuration in which an opening is provided to the high melting point metal layer constituting an external layer, whereby the low melting point metal layer constituting an internal layer is exposed outward.

In the protection element 230, an insulating layer 232 is formed in an area between the first fusible conductor 231a and the second fusible conductor 231b on the heating body extraction electrode 16. The insulating layer 232 prevents an increase in the volume of a molten conductor, the increase having been caused by the union of the molten first fusible conductor 231a and the molten second fusible conductor 231b, and the insulating layer 232 is formed by using a known insulating material by a known method.

A flux (not illustrated) is applied on a surface of the fusible conductor 231. Furthermore, the protection element 230 has the same configuration as the above-mentioned protection element 10 has, except that a plurality of the fusible conductors 231 is used in place of the fusible conductor 13, and the insulating layer 232 is formed around the fusible conductor connecting portion 16a arranged on the heating body extraction electrode 16. In the fusible conductor 231, the high melting point metal layer may be formed by using the same material as that used for the above-mentioned high melting point metal layer 13a, meanwhile the low melting point metal layer may be formed by using the same material as that used for the above-mentioned low melting point metal layer 13b.

Figure 27:
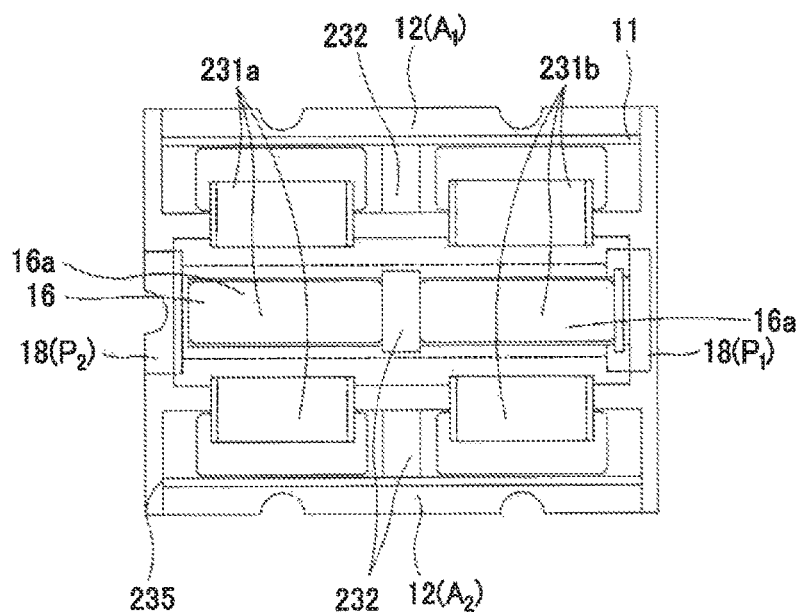
FIG. 27 is a plan view illustrating a state in which, in a protection element provided with a plurality of fusible conductors and having an insulating layer formed on a heating body extraction electrode, the fusible conductor has been fused.

As shown in FIG. 27, in the protection element 230, also in the case where the first fusible conductor 231a and the second fusible conductor 231b are melted, the insulating layer 232 prevents the molten conductors from running along the heating body extraction electrode 16 and combining each other. Thus, in the protection element 230, even in the case where the whole volume of the fusible conductor 231 is increased thereby to improve the rating, there can be prevented a situation in which a molten conductor is drawn close to one side by running along the heating body extraction electrode 16, thereby aggregating between each of the electrodes 12(A1) and 12(A2) and the heating body extraction electrode 16 and thus not being able to be fused, and as a result, the fusible conductor 231 can be surely fused.

It should be noted that, in the protection element 230, the insulating layer 232 may be formed also around the fusible conductor connecting portion on the electrodes 12(A1) and 12(A2). Thus, in the protection element 230, there can be prevented a situation in which a molten conductor is drawn close to one side by running along the electrodes 12(A1) and 12(A2), thereby aggregating between each of the electrodes 12(A1) and 12(A2) and the heating body extraction electrode 16 and thus not being able to be fused.

Also, in the case where the fusible conductor 231 has a structure in which a low melting point metal layer and a high melting point metal layer are laminated, solder may be used as a metal to constitute a low melting point metal, meanwhile a surface of the high melting point metal layer may be coated with Au or a film containing Au as a main component. Thus, in the fusible conductor 231, wettability of the solder constituting the low melting point metal can be further improved, whereby the erosion action can be promoted.

Furthermore, as shown in FIG. 26, in the protection element 230, an insulating layer 235 may be formed in a longitudinal direction of the electrodes 12(A1) and 12(A2). The insulating layer 235 prevents a molten conductor from crossing over the electrodes 12(A1) and 12(A2) and aggregating in an exterior electrode, and is formed outside a connecting area of the fusible conductor 231 to the electrodes 12(A1) and 12(A2). As shown in FIG. 27, the insulating layer 235 provided in the protection element 230 leads to a molten conductor to aggregate on the electrodes 12(A1) and 12(A2), thereby preventing the molten conductor from flowing out to an external electrode.

MODIFIED EXAMPLE 19

Figure 28:
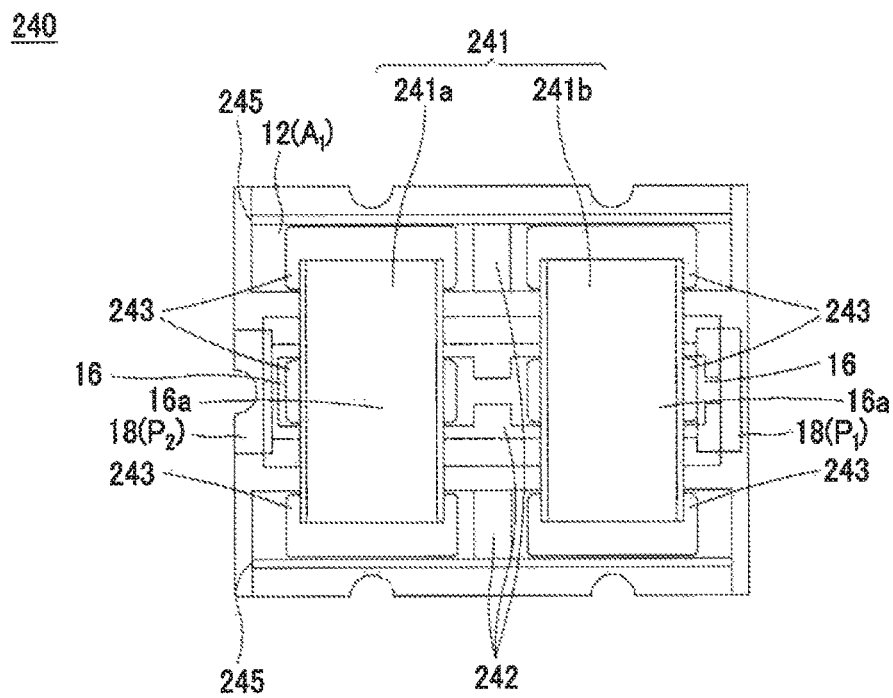
FIG. 28 is a plan view illustrating a protection element in which a plurality of fusible conductors is provided and also a narrower portion is formed on a heating body extraction electrode.

FIG. 28 illustrates another modified example wherein a plurality of fusible conductors is used.

As is the case with the above-mentioned protection element 230, a protection element 240 shown in FIG. 28 is obtained by upsizing a fusible conductor 241 so as to increase the rating of the protection element 240 for the use of high currents.

The protection element 240 has a plurality of divided fusible conductors and also a narrow portion 242 which is formed around a fusible conductor connecting portion 16a arranged on a heating body extraction electrode 16, the narrow portion 242 being formed so as to be narrower than said fusible conductor connecting portion 16a. For example, as shown in FIG. 28, in the protection element 240, a first fusible conductor 241a and a second fusible conductor 241b are formed thereby to improve the rating as a whole. The first fusible conductor 241a and the second fusible conductor 241b each are connected to from an electrode 12(A1) via the heating body extraction electrode 16 to an electrode 12(A2) by a low melting point metal 243, such as solder. Furthermore, the first fusible conductor 241a and the second fusible conductor 241b are arranged so as to be spaced at a predetermined distance from each other.

The first fusible conductor 241a and the second fusible conductor 241b each have a layered structure in which a low melting point metal layer constituting an internal layer is coated with a high melting point metal layer constituting an external layer, and, as shown in FIG. 28, said conductors each are connected to the electrodes 12(A1) and 12(A2) and the heating body extraction electrode 16 via the low melting point metal 243. Alternatively, the first fusible conductor 241a and the second fusible conductor 241b each may have a layered structure in which a low melting point metal layer and a high melting point metal layer are laminated, and said conductors each may be connected to the electrodes 12(A1) and 12(A2) and the heating body extraction electrode 16 via the low melting point metal layer constituting a lower layer. Alternatively, the first fusible conductor 241a and the second fusible conductor 241b each may have a single-layer structure comprising only a high melting point metal layer, and said conductors each may be connected to the electrodes 12(A1) and 12(A2) and the heating body extraction electrode 16 via a low melting point metal. Alternatively, the first fusible conductor 241a and the second fusible conductor 241b each may have a configuration in which an opening is provided to a high melting point metal layer constituting an external layer, whereby a low melting point metal layer constituting an internal layer is exposed outward.

In the protection element 240, the narrow portion 242, which is narrower than the fusible conductor connecting portion 16a, is formed in an area between the first fusible conductor 241a and the second fusible conductor 241b arranged on the heating body extraction electrode 16. The narrow portion 242 prevents an increase in the volume of a molten conductor, the increase in volume being caused by the union of the molten first fusible conductor 241a and the molten second fusible conductor 241b, and said narrow portion 242 is formed by printing a predetermined pattern on the heating body extraction electrode 16 and baking said heating body extraction electrode. Alternatively, the narrow portion 242 may be formed by providing an insulating layer on the heating body extraction electrode 16.

A flux (not illustrated) is applied on a surface of the fusible conductor 241. Furthermore, the protection element 240 has the same configuration as the above-mentioned protection element 10 has, except that a plurality of the fusible conductors 241 is used in place of the fusible conductor 13, and the narrow portion 242 is formed around the fusible conductor connecting portion 16a of the heating body extraction electrode 16. Furthermore, in the fusible conductor 241, a high melting point metal layer may be formed by using the same material as that used for the above-mentioned high melting point metal layer 13a, meanwhile a low melting point metal layer may be formed by using the same material as that used for the above-mentioned low melting point metal layer 13b.

Figure 29:
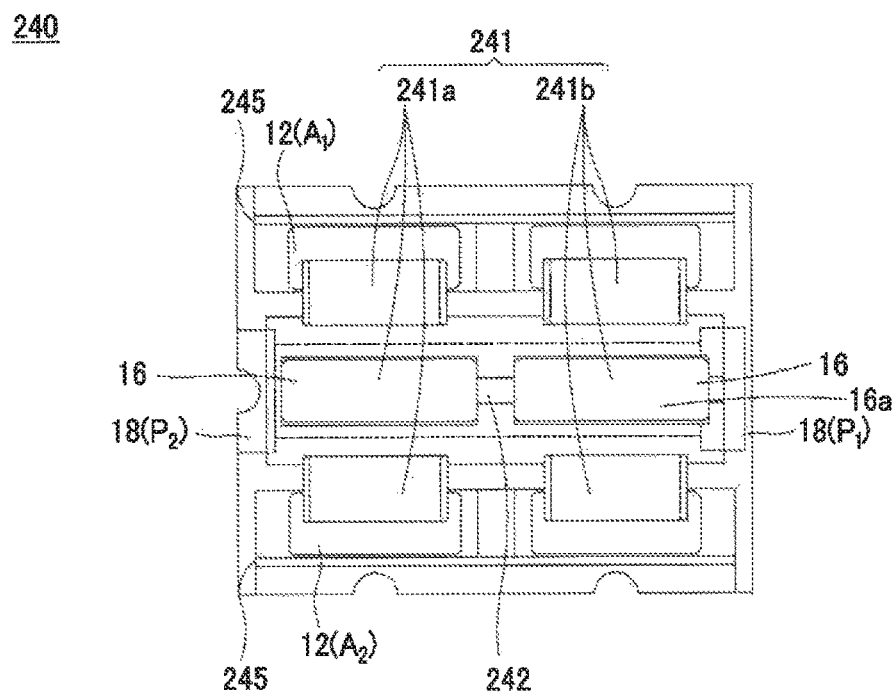
FIG. 29 is a plan view illustrating a state in which, in a protection element provided with a plurality of fusible conductors and having a narrower portion formed on a heating body extraction electrode, the fusible conductor has been fused.

As shown in FIG. 29, in the protection element 240, also in the case where the first fusible conductor 241a and the second fusible conductor 241b are melted, the molten conductors do not flow into the narrower portion 242 but aggregate in the fusible conductor connecting portion 16a which is wider than the narrower portion 242, whereby the molten conductors are prevented from running along the heating body extraction electrode 16 to combine each other. Thus, in the protection element 240, even in the case where the whole volume of the fusible conductor 241 is increased thereby to improve the rating, there can be prevented a situation in which the molten conductors are drawn close to one side by running along the heating body extraction electrode 16, thereby aggregating between each of the electrodes 12(A1) and 12(A2) and the heating body extraction electrode 16 and thus not being able to be fused, and as a result, the fusible conductor 241 can be surely fused.

It should be noted that, in the protection element 240, the narrow portion 242 may be formed also around the fusible conductor connecting portion arranged on the electrodes 12(A1) and 12(A2). Thus, in the protection element 240, there can be prevented a situation in which the molten conductors are drawn close to one side by running along the electrodes 12(A1) and 12(A2), thereby aggregating between each of the electrodes 12(A1) and 12(A2) and the heating body extraction electrode 16 and thus not being able to be fused.

In the case where the fusible conductor 241 has a structure in which a low melting point metal layer and a high melting point metal layer are laminated, solder may be used as a metal to constitute a low melting point metal, meanwhile a surface of the high melting point metal layer may be coated with Au or a film containing Au as a main component. Thus, in the fusible conductor 241, wettability of the solder constituting the low melting point metal can be further improved, whereby the erosion action can be promoted.

Furthermore, also in the protection element 240, an insulating layer 245 may be formed in a longitudinal direction of the electrodes 12(A1) and 12(A2), as shown in FIG. 28. The insulating layer 245 prevents the molten conductors from crossing over the electrodes 12(A1) and 12(A2) and aggregating in an exterior electrode, and is formed outside a connecting area of the fusible conductor 241 to the electrodes 12(A1) and 12(A2). As shown in FIG. 29, the insulating layer 245 provided in the protection element 240 leads to the molten conductors to aggregate on the electrodes 12(A1) and 12(A2), thereby preventing the molten conductors from flowing out to an external electrode.

REFERENCE SIGNS LIST 10, 40, 50, 60, 70, 80, 90, 100, 110, 120, 130, 140, 150, 160, 170, 180, 190, 200, 210, 220, 230, 240 . . . protection element,
11, 41 . . . insulating substrate,
12(A1), 12(A2), 42 . . . electrode, 13, 91, 121 . . . fusible conductor,
13a, 43a, 91a, 121a . . . high melting point metal layer,
13b, 43b, 91b, 121b, 121c . . . low melting point metal layer,
14, 44 . . . heating body,
15, 45 . . . insulating member,
16 . . . heating body extraction electrode,
17, 47 . . . flux,
18(P1), 18(P2), 48 . . . heating body electrode,
20 . . . battery pack,
20a . . . positive electrode terminal,
20b . . . negative electrode terminal,
21 to 24 . . . battery cell,
25 . . . battery stack,
26 . . . detection circuit,
27, 31, 32 . . . current control element,
30 . . . charge-and-discharge control circuit,
33 . . . control unit,
35 . . . charging apparatus,
41a . . . glass layer,
51 . . . accumulation portion,
52 . . . Ni/Au plating layer,
61 . . . opening,
92 . . . low melting point metal layer,
93 . . . plating layer,
95 . . . electrically conductive paste,
132 . . . cover member

The invention claimed is:

1. A protection element, comprising:
an insulating substrate;
a heating body laminated on the insulating substrate;
an insulating member laminated on the insulating substrate so as to cover at least the heating body;
first and second electrodes laminated on the insulating substrate having the insulating member laminated thereon;
a heating body extraction electrode electrically connected to said heating body on a current path between the first and second electrodes; and
a fusible conductor laminated on the heating body extraction electrode over a range from the heating body extraction electrode to the first and second electrodes, and fusing the current path between the first and second electrodes by heating, the fusible conductor having a first part that is in direct contact with the heating body extraction electrode and is separated from the insulating member by the heating body extraction electrode, and a second part that is not in contact with the heating body extraction electrode and is separated from the insulating member by a gap formed between the fusible conductor and the insulating member,
wherein the fusible conductor comprises a layered body including at least a high melting point metal layer and a low melting point metal layer, and
wherein the fusible conductor has a coating structure including the low melting point metal layer as an internal layer and the high melting point metal layer as an external layer, and
wherein the low melting point metal layer is melted by a heat generated by the heating body, whereby, while eroding the high melting point metal layer, the low melting point metal layer is drawn close to sides of the first and second electrodes and the heating body extraction electrode, and fused, said first and second electrodes and said heating body extraction electrode each having high wettability for the low melting point metal.

2. The protection element according to claim 1, wherein the low melting point metal layer is made of Pb-free solder, meanwhile the high melting point metal layer is made of Ag or Cu, or a metal containing Ag or Cu as a main component.

3. The protection element according to claim 1, wherein the fusible conductor is connected by a low melting point metal at positions to be connected to the first and second electrodes and the heating body extraction electrode.

4. The protection element according to claim 1, wherein any one plating treatment selected from Ni/Au plating, Ni/Pd plating, and Ni/Pd/Au plating is performed on surfaces of the first and second electrodes and the heating body extraction electrode.

5. The protection element according to claim 1, wherein an insulating member layer is provided between the heating body and the insulating substrate.

6. The protection element according to claim 1, wherein the low melting point metal layer has a larger volume than the high melting point metal layer has.

7. The protection element according to claim 1, wherein the gap comprises air.

* * * * *